United States Patent
Desrochers et al.

(10) Patent No.: US 12,327,072 B2
(45) Date of Patent: Jun. 10, 2025

(54) METHOD AND SYSTEM FOR HELMET SELECTION AND/OR CUSTOMIZATION

(71) Applicants: BAUER HOCKEY LTD., Blainville (CA); BAUER HOCKEY, LLC, Exeter, NH (US)

(72) Inventors: Charles-Antoine Desrochers, Blainville (CA); Jacques Durocher, Blainville (CA); Thierry Krick, Blainville (CA); Thomas Lemelin, Blainville (CA); Jean-Francois Laperriere, Blainville (CA); Guillaume Beaulieu, Blainville (CA); Adam Carlin, Exeter, NH (US); Mathieu Desjardins, Blainville (CA)

(73) Assignee: BAUER HOCKEY LLC, Exeter, NH (US)

( * ) Notice: Subject to any disclaimer, the term of this patent is extended or adjusted under 35 U.S.C. 154(b) by 0 days.

(21) Appl. No.: 18/279,762

(22) PCT Filed: Mar. 1, 2022

(86) PCT No.: PCT/US2022/018322
§ 371 (c)(1),
(2) Date: Aug. 31, 2023

(87) PCT Pub. No.: WO2022/187232
PCT Pub. Date: Sep. 9, 2022

(65) Prior Publication Data
US 2024/0143867 A1    May 2, 2024

Related U.S. Application Data

(60) Provisional application No. 63/154,917, filed on Mar. 1, 2021.

(51) Int. Cl.
*G06F 30/20* (2020.01)
*A42B 3/06* (2006.01)
(Continued)

(52) U.S. Cl.
CPC .............. *G06F 30/20* (2020.01); *A42B 3/063* (2013.01); *A42B 3/065* (2013.01); *G06Q 30/0641* (2013.01)

(58) Field of Classification Search
CPC ...... G06F 30/20; G06F 30/17; G06F 2111/16; A42B 3/063; A42B 3/065; A42B 3/124; A42B 3/127; G06Q 30/0641; A42C 2/007
See application file for complete search history.

(56) References Cited

U.S. PATENT DOCUMENTS 5,056,162 A * 10/1991 Tirums .................. A42C 2/007
                                                              2/909
5,324,460 A *  6/1994 Briggs .................. A42C 2/007
                                                              264/45.2
(Continued)

FOREIGN PATENT DOCUMENTS

WO        2022187232 A2     9/2022

OTHER PUBLICATIONS

International Search Report and Written Opinion issued in connection with international patent application PCT/US2022/018322, mailed Jul. 1, 2022, 25 pages.

*Primary Examiner* — Robert H Muromoto, Jr.

(57) ABSTRACT

A helmet selection/customization process, which includes obtaining a 3D scan of a user's head; identifying a retail helmet variant that would fit the user's head; providing the user with an option to select the identified retail helmet variant or design a custom liner for a base helmet; and in case the user selects to design a custom helmet, causing generation of a 3D model of a custom liner based on the 3D scan and a 3D model of the base helmet. The method includes determining, based on the 3D scan, parameters associated with the user's head; and accessing a database storing parameters associated with a plurality of retail helmet variants, wherein the identifying is carried out based on (Continued)

processing of the parameters associated with the user's head and the parameters stored in the database, so as to identify one of the variants in the plurality of retail helmet variants.

27 Claims, 30 Drawing Sheets

(51) Int. Cl.
*G06Q 30/0601* (2023.01)
*A42B 3/10* (2006.01)

(56) References Cited

U.S. PATENT DOCUMENTS

| | | | | |
|---|---|---|---|---|
| 5,891,372 | A * | 4/1999 | Besset | A42C 2/007 |
| | | | | 264/222 |
| 9,545,127 | B1 * | 1/2017 | Sandifer | A42B 3/121 |
| 10,159,296 | B2 * | 12/2018 | Pietrzak | G05B 19/4099 |
| 10,212,983 | B2 * | 2/2019 | Knight | A42C 2/002 |
| 2006/0101559 | A1 * | 5/2006 | Moore, III | A42C 2/007 |
| | | | | 2/410 |
| 2009/0153552 | A1 * | 6/2009 | Fidaleo | G06Q 30/02 |
| | | | | 345/419 |
| 2014/0121792 | A1 * | 5/2014 | Jennings | A63F 13/20 |
| | | | | 473/499 |
| 2018/0253079 | A1 * | 9/2018 | McInnis | G05B 19/4099 |
| 2019/0269194 | A1 * | 9/2019 | Pietrzak | B33Y 50/02 |
| 2020/0113267 | A1 * | 4/2020 | Light | A42B 3/124 |
| 2020/0215415 | A1 * | 7/2020 | Bologna | G06T 17/00 |

\* cited by examiner

METHOD AND SYSTEM FOR HELMET SELECTION AND/OR CUSTOMIZATION

CROSS-REFERENCE TO RELATED APPLICATION

This application is a National Phase Entry of international PCT patent application No. PCT/US2022-018322 filed on Mar. 1, 2022, which claims the benefit of U.S. Provisional Patent Application Ser. No. 63/154,917, filed on Mar. 1, 2021. The contents of these applications are incorporated by reference herein.

FIELD

The present disclosure relates to selection and customization of headgear and, in particular, to selection and customization of helmets for the practice of sports such as hockey.

BACKGROUND

Despite mass-market helmets being available in a number of sizes and models, custom helmets tend to provide improved comfort and style. As such, the demand for custom helmets is growing, particularly among athletes outside of professional leagues.

In contact sports, such as ice hockey and football, helmets must meet certain safety standards in order to be retailed to the public. One challenge therefore becomes how to ensure that a custom helmet, which is made-to-order and will never be exposed to destructive testing, meets the relevant safety standards.

Although certain players may be attracted by the advantages of a custom helmet, it remains the case that custom helmets are somewhat expensive, and not all players can afford a custom helmet. Also, there is a time delay associated with traditional customization process, which could turn players away from purchasing a custom helmet, causing them to opt for a mass-market helmet, potentially from a different manufacturer.

Thus, there exists a need to provide customers with an improved way of choosing a suitable helmet, particularly at the point of sale.

SUMMARY

According to a broad aspect, there is provided a computer-implemented helmet selection/customization process, which comprises: obtaining a 3D scan of a user's head; identifying a retail helmet variant that would fit the user's head; providing the user with an option to select the identified retail helmet variant or design a custom liner for a base helmet; and in case the user selects to design a custom helmet, causing generation of a 3D model of a custom liner based on the 3D scan of the user's head and a 3D model of the base helmet.

According to another broad aspect, there is provided a non-transitory computer-readable storage medium storing computer-readable instructions which, when executed by a processor of a computing apparatus, cause the computing apparatus to carry out a method that comprises: obtaining a 3D scan of a user's head; identifying a retail helmet variant that would fit the user's head; providing the user with an option to select the identified retail helmet variant or design a custom liner for a base helmet; and in case the user selects to design a custom helmet, causing generation of a 3D model of a custom liner based on the 3D scan of the user's head and a 3D model of a base helmet.

According to a broad aspect, there is provided a system, comprising: a 3D scanning apparatus; and a computing apparatus. The computing apparatus comprises: a processor; an interface operatively coupled to the 3D scanning apparatus; and a non-transitory computer-readable storage medium storing computer-readable instructions which, when executed by the processor, cause the computing apparatus to carry out a method. Such method comprises: obtaining a 3D scan of a user's head from the 3D scanning apparatus via the interface; identifying a retail helmet variant that would fit the user's head; providing the user with an option to select the identified retail helmet variant or design a custom liner for a base helmet; and in case the user selects to design a custom helmet, causing generation of a 3D model of a custom liner based on the 3D scan of the user's head and a 3D model of the base helmet.

According to a broad aspect, there is provided a method of operating a computing apparatus to design a custom helmet liner, comprising: obtaining a 3D scan of a user's head; determining, based on the 3D scan of the user's head, at least one adjustment setting for fitting an adjustable retail helmet to the user's head; determining a configuration of a custom liner for attachment to an inner surface of a fixed-shell base helmet in the same helmet line as the adjustable retail helmet, the base helmet having dimensions consistent with the adjustable retail helmet when adjusted to the at least one adjustment setting; and outputting a signal indicative of the custom liner configuration or storing the custom liner configuration in a non-transitory memory.

According to a broad aspect, there is provided a non-transitory computer-readable storage medium storing computer-readable instructions which, when executed by a processor of a computing apparatus, cause the computing apparatus to carry out a method that comprises: determining, based on the 3D scan of the user's head, at least one adjustment setting for fitting an adjustable retail helmet to the user's head; determining a configuration of a custom liner for attachment to an inner surface of a fixed-shell base helmet in the same helmet line as the adjustable retail helmet, the base helmet having dimensions consistent with the adjustable retail helmet when adjusted to the at least one adjustment setting; and outputting a signal indicative of the custom liner configuration or storing the custom liner configuration in a non-transitory memory.

According to a broad aspect, there is provided a system, comprising: a 3D scanning apparatus; and a computing apparatus. The computing apparatus comprises a processor; an interface operatively coupled to the 3D scanning apparatus; and a non-transitory computer-readable storage medium storing computer-readable instructions which, when executed by the processor, cause the computing apparatus to carry out a method. Such method comprises: determining, based on the 3D scan of the user's head, at least one adjustment setting for fitting an adjustable retail helmet to the user's head; determining a configuration of a custom liner for attachment to an inner surface of a fixed-shell base helmet in the same helmet line as the adjustable retail helmet, the base helmet having dimensions consistent with the adjustable retail helmet when adjusted to the at least one adjustment setting; and outputting a signal indicative of the custom liner configuration or storing the custom liner configuration in a non-transitory memory.

According to a broad aspect, there is provided a helmet, comprising: a shell; protective padding affixed to or integrated with the shell; and a custom liner attached to the protective padding and/or the shell. The custom liner made by a process that comprises: obtaining a 3D scan of a user's head; determining, based on the 3D scan of the user's head, at least one adjustment setting for fitting an adjustable retail helmet to the user's head; determining a configuration of a custom liner for attachment to an inner surface of a fixed-shell base helmet in the same helmet line as the adjustable retail helmet, the base helmet having dimensions consistent with the adjustable retail helmet when adjusted to the at least one adjustment setting; and creating the custom liner based on the custom liner configuration.

According to a broad aspect, there is provided a computer-implemented helmet selection and/or customization process, comprising: obtaining dimensions of a user's head from a 3D scan of the user's head; obtaining user input indicative of a skill level; obtaining user input indicative of a key performance attribute; identifying a retail helmet variant based on the dimensions of the user's head, on the skill level and on the key performance attribute; and outputting a signal indicative of the identified retail helmet variant or storing an indication of the identified retail helmet variant in a non-transitory memory.

According to a broad aspect, there is provided a non-transitory computer-readable storage medium storing computer-readable instructions which, when executed by a processor of a computing apparatus, cause the computing apparatus to carry out a method that comprises: obtaining dimensions of a user's head from a 3D scan of the user's head; obtaining user input indicative of a skill level; obtaining user input indicative of a key performance attribute; identifying a retail helmet variant based on the dimensions of the user's head, on the skill level and on the key performance attribute; and outputting a signal indicative of the identified retail helmet variant or storing an indication of the identified retail helmet variant in a non-transitory memory.

According to a broad aspect, there is provided a system, comprising: a 3D scanning apparatus; and a computing apparatus. The computing apparatus comprises: a processor; an interface operatively coupled to the 3D scanning apparatus; and a non-transitory computer-readable storage medium storing computer-readable instructions which, when executed by the processor, cause the computing apparatus to carry out a method. Such method comprises: obtaining dimensions of a user's head from a 3D scan of the user's head; obtaining user input indicative of a skill level; obtaining user input indicative of a key performance attribute; identifying a retail helmet variant based on the dimensions of the user's head, on the skill level and on the key performance attribute; and outputting a signal indicative of the identified retail helmet variant or storing an indication of the identified retail helmet variant in a non-transitory memory.

According to a broad aspect, there is provided a computer-implemented helmet selection and/or customization process, comprising: obtaining dimensions of a user's head from a 3D scan of the user's head; determining a hair factor indicative of an amount of hair on the user's head; identifying a retail helmet variant based on the dimensions of the user's head and on the hair factor; and outputting a signal indicative of the identified retail helmet variant or storing an indication of the identified retail helmet variant in a non-transitory memory.

According to a broad aspect, there is provided a non-transitory computer-readable storage medium storing computer-readable instructions which, when executed by a processor of a computing apparatus, cause the computing apparatus to carry out a method that comprises: obtaining dimensions of a user's head from a 3D scan of the user's head; determining a hair factor indicative of an amount of hair on the user's head; identifying a retail helmet based on the dimensions of the user's head and on the hair factor; and outputting a signal indicative of the identified retail helmet or storing an indication of the identified retail helmet in a non-transitory memory.

According to a broad aspect, there is provided a system, comprising: a 3D scanning apparatus; and a computing apparatus. The computing apparatus comprises a processor; an interface operatively coupled to the 3D scanning apparatus; and a non-transitory computer-readable storage medium storing computer-readable instructions which, when executed by the processor, cause the computing apparatus to carry out a method. Such method comprises: obtaining dimensions of a user's head from a 3D scan of the user's head; determining a hair factor indicative of an amount of hair on the user's head; identifying a retail helmet based on the dimensions of the user's head and on the hair factor; and outputting a signal indicative of the identified retail helmet or storing an indication of the identified retail helmet in a non-transitory memory.

BRIEF DESCRIPTION OF THE DRAWINGS

These and other aspects will now be described in greater detail with reference to the accompanying drawings, in which.

The drawings are provided for the purposes of illustrating certain features and embodiments, and are not to be considered limiting.

DETAILED DESCRIPTION

Aspects of the present disclosure are generally applicable to a variety of helmets, including hockey helmets (such as for players or goalies), as well as helmets for other sports (e.g., football, horseback riding, etc.) and activities (e.g., motorcycle riding, construction, etc.).

Figure 1A:
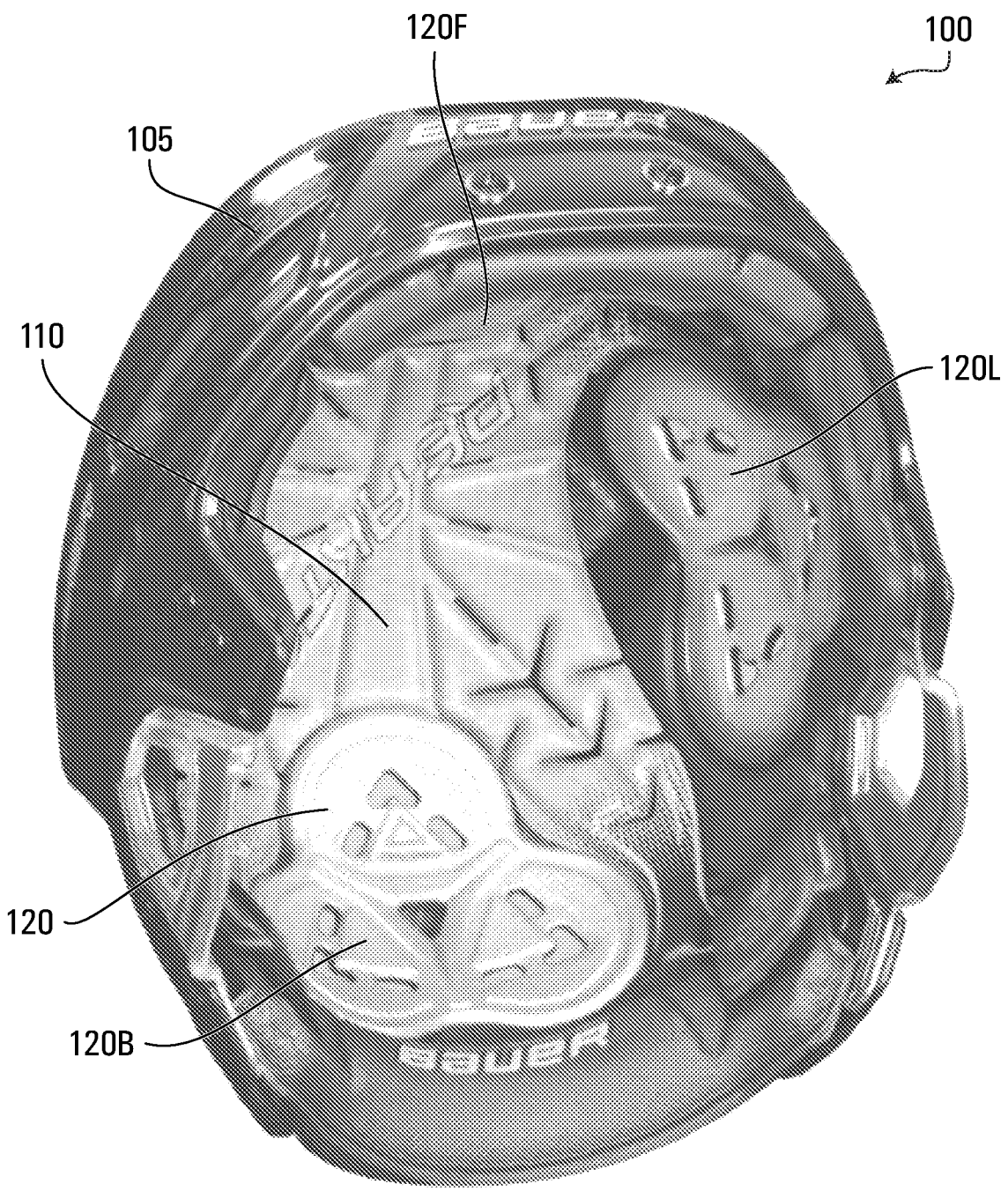
FIG. 1A is a perspective view of a hockey helmet.
Figure 1B:
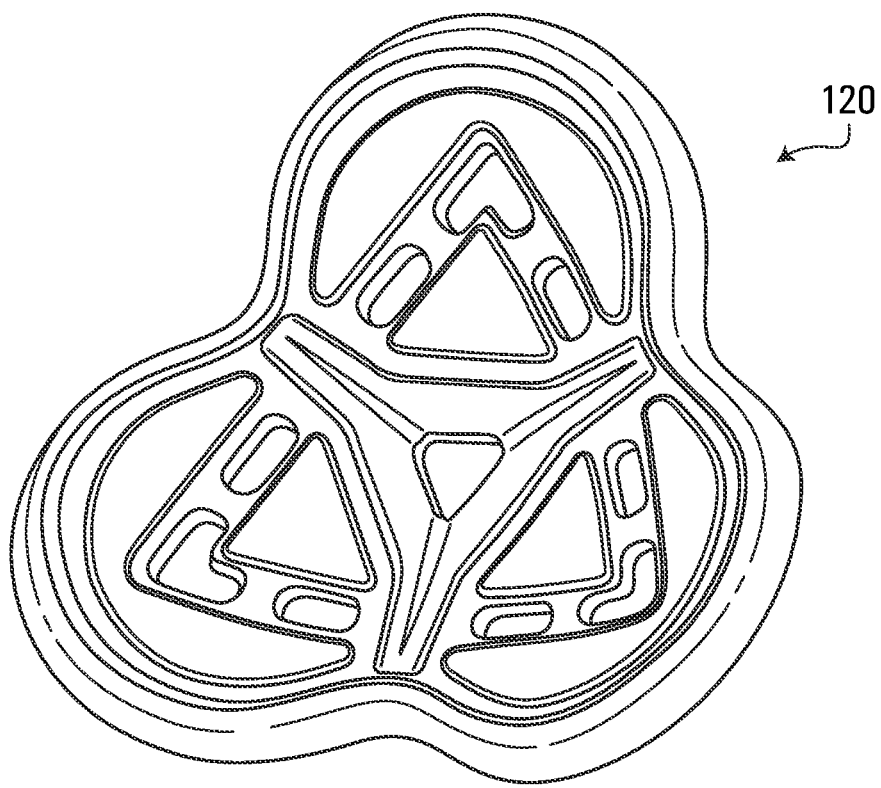
FIG. 1B is a perspective view of a comfort pad of the helmet of FIG. 1.
Figure 2A:
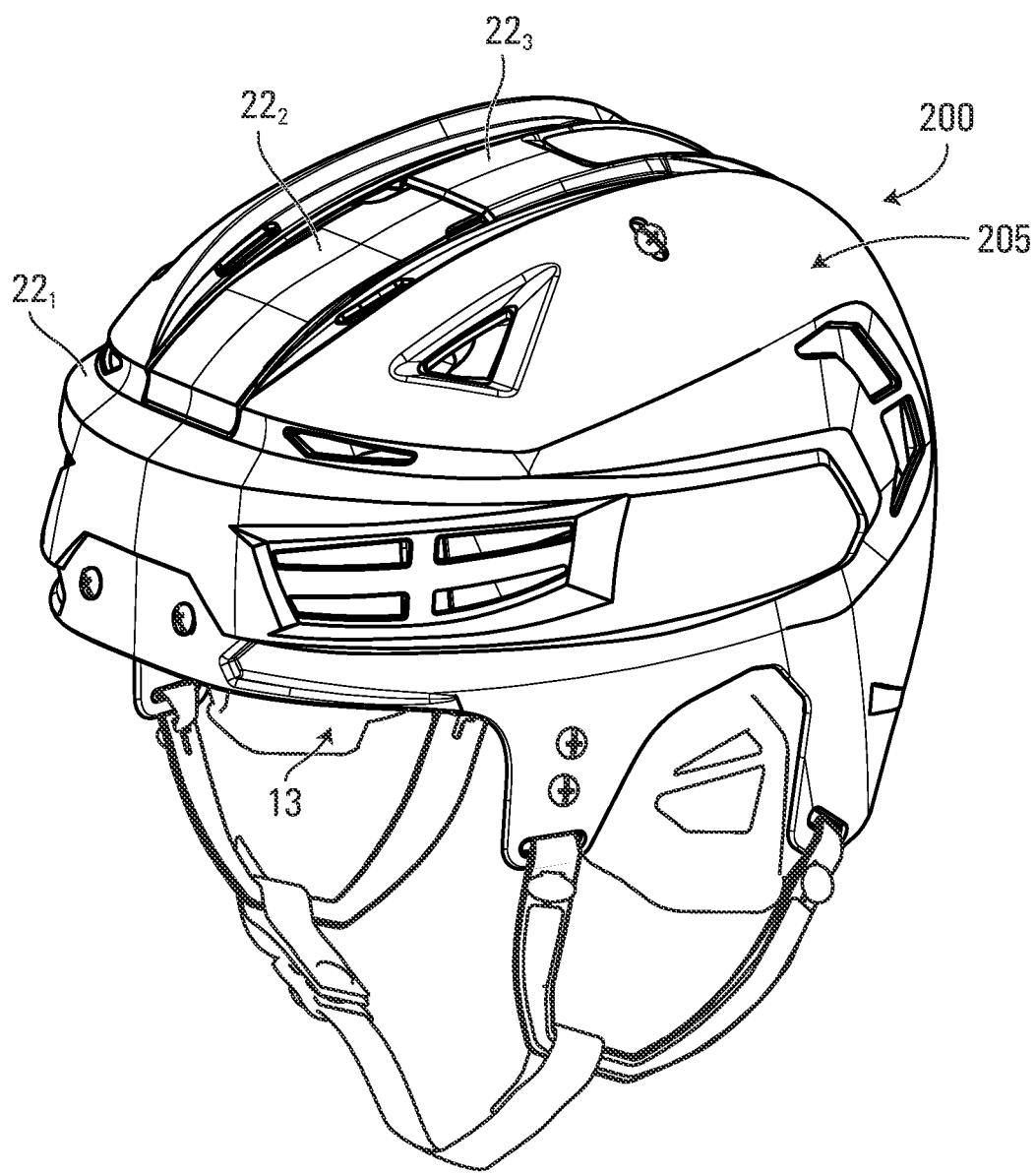
FIG. 2A is a perspective view of an adjustable retail helmet.
Figure 2B:
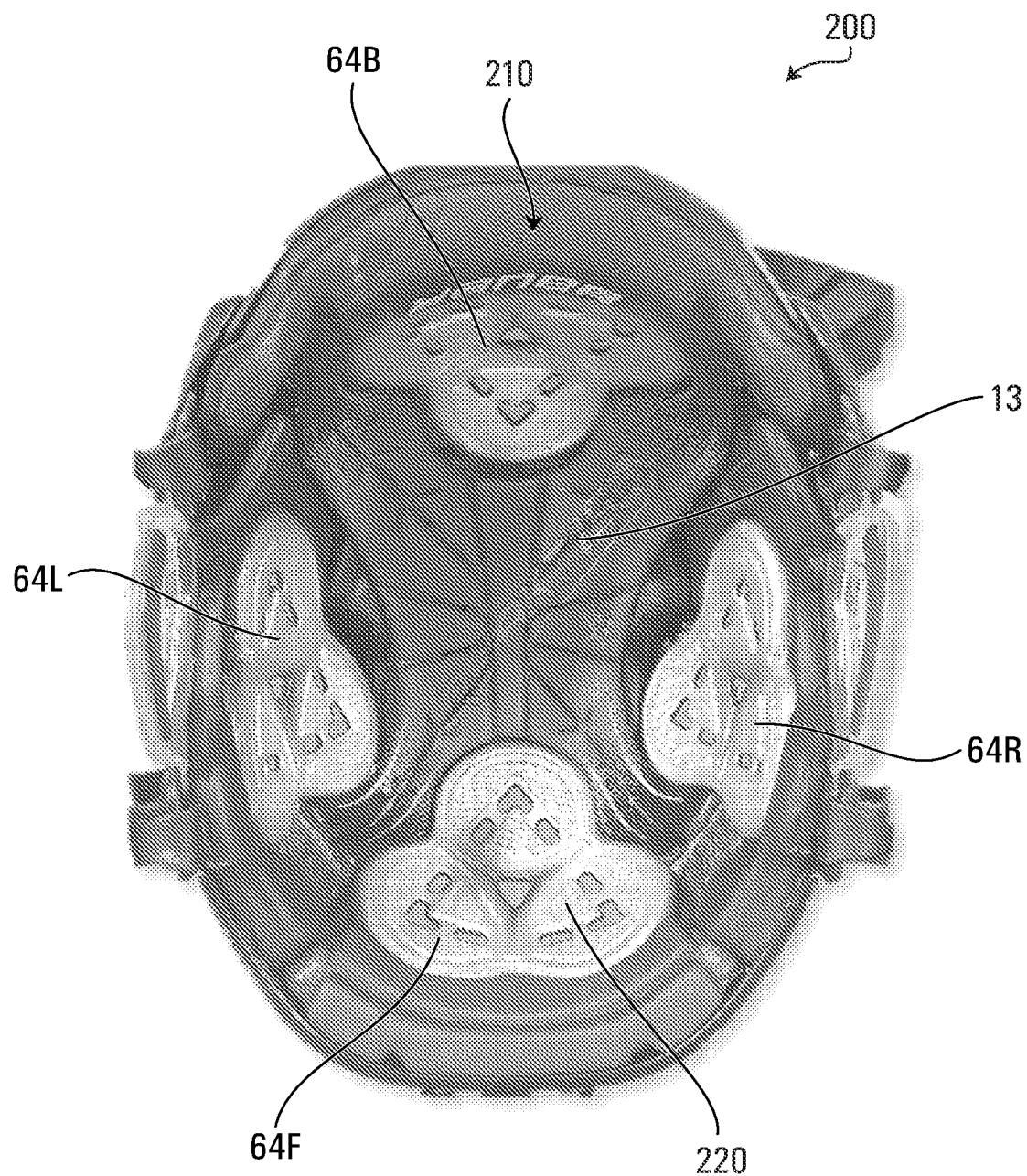
FIG. 2B is a bottom view of the adjustable retail helmet of FIG. 2A.
Figure 2C:
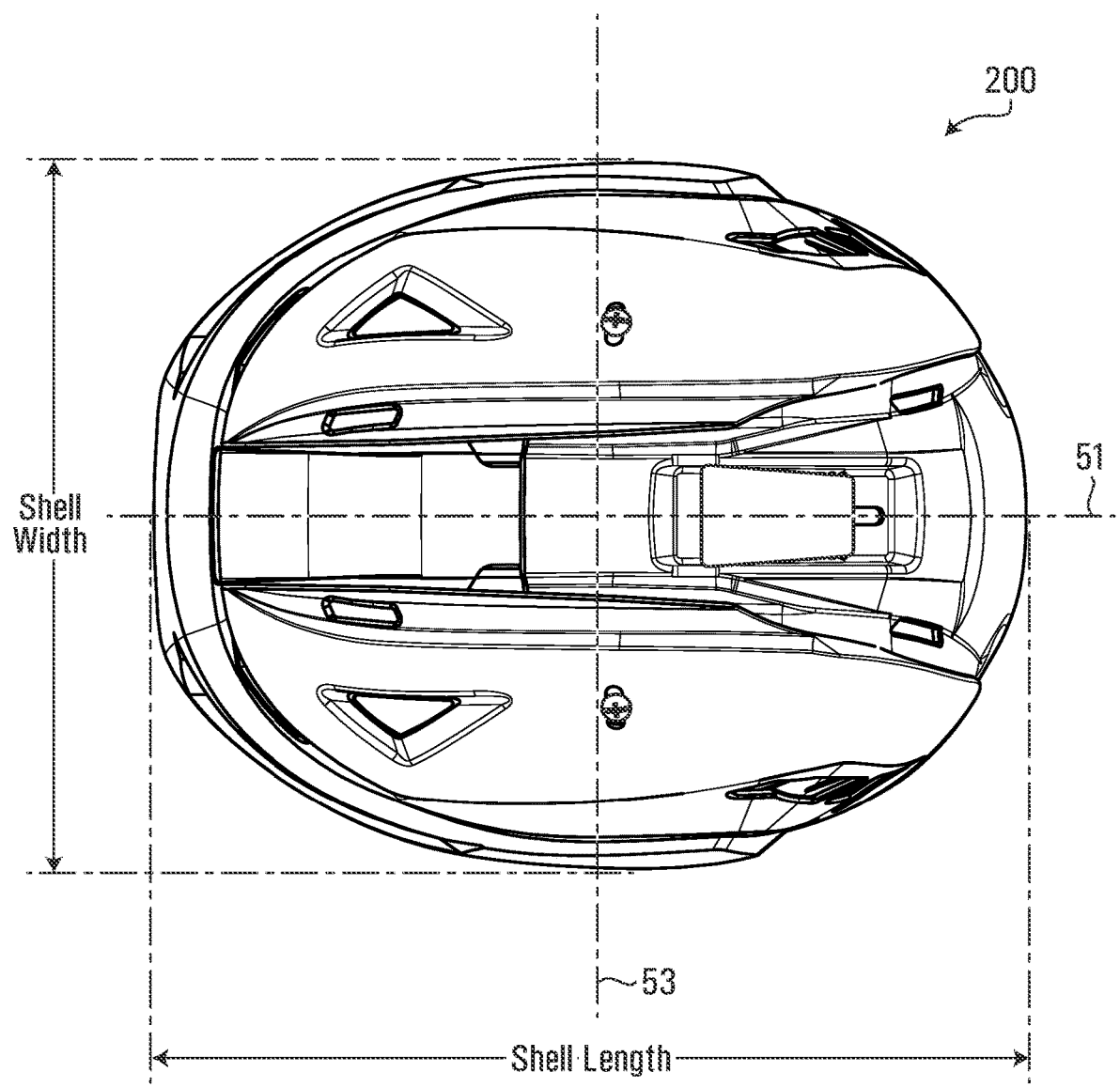
FIG. 2C is a plan view of the adjustable retail helmet of FIG. 2A.
Figure 2D:
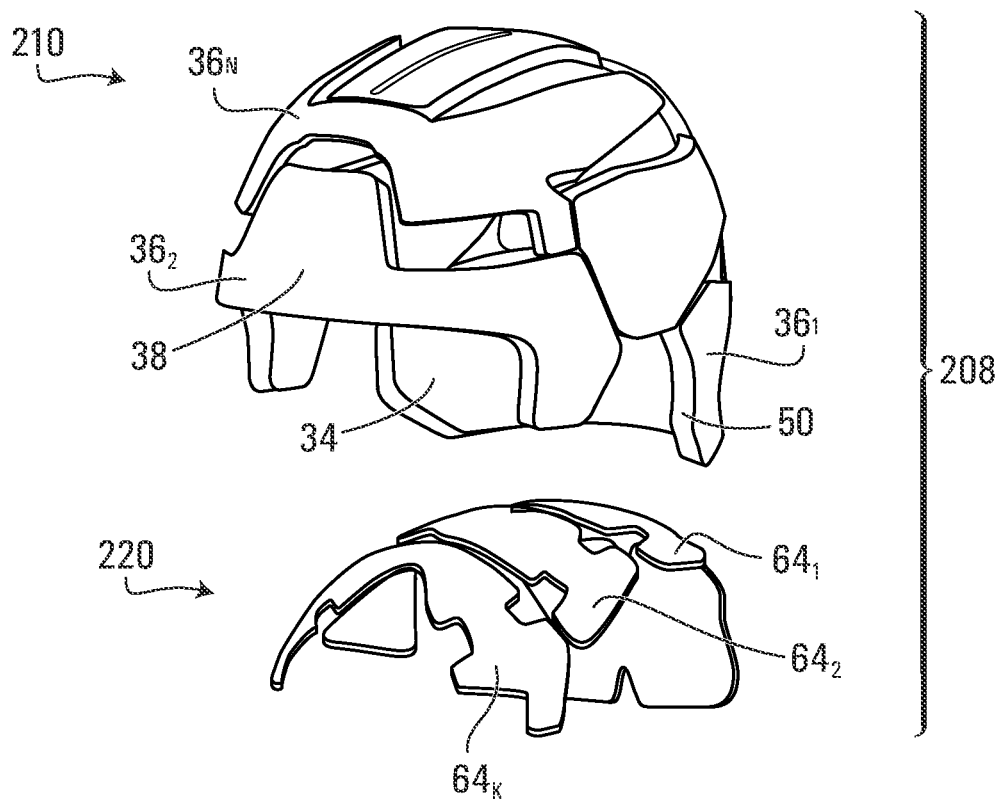
FIG. 2D is an exploded perspective view of interior padding of the adjustable retail helmet of FIG. 2A.
Figure 2E:
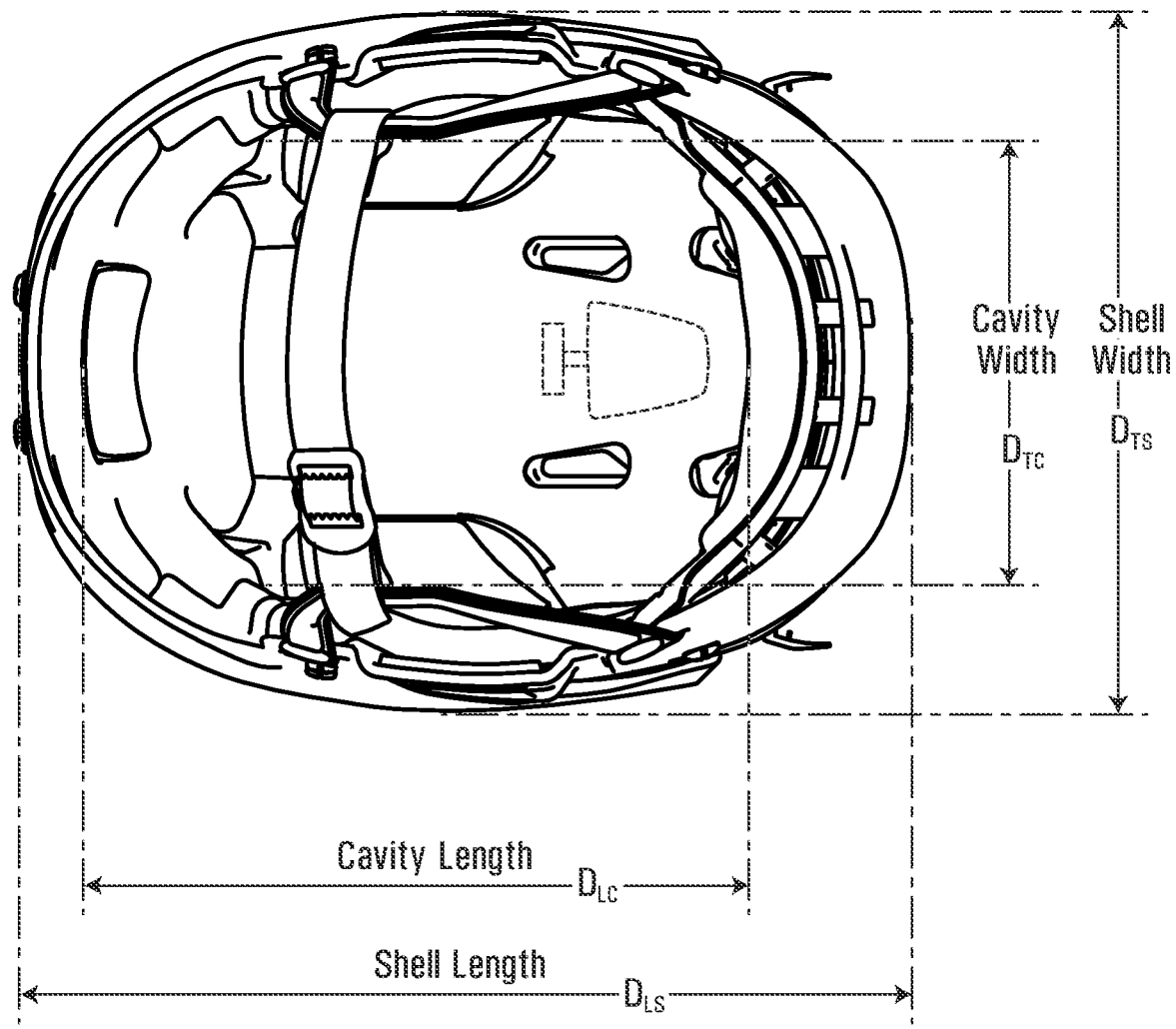
FIG. 2E is another bottom view of the adjustable retail helmet of FIG. 2A, showing how cavity and shell dimensions are measured.
Figure 2F:
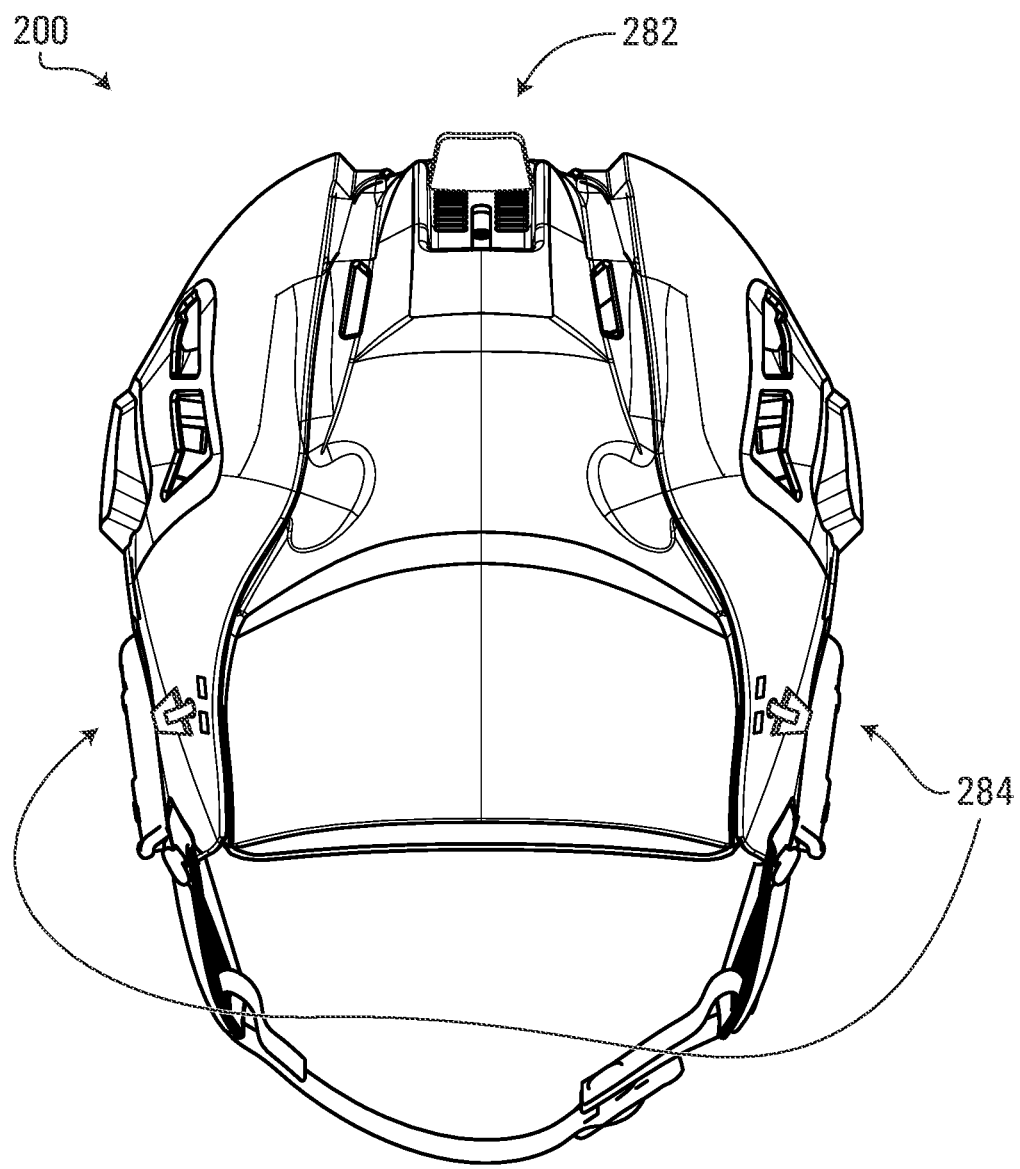
FIG. 2F is a rear perspective view of the adjustable retail helmet of FIG. 2A, showing adjustment mechanisms for adjusting the dimensions of the adjustable retail helmet.

With reference to FIGS. 1A and 1B, there is shown a helmet 100 for a hockey player. The helmet 100 includes a shell 105, which can be a one-piece shell or a multi-piece shell. The helmet 100 comprises interior padding. The interior padding includes protective padding 110 and may also include comfort padding 120.

The protective padding 110 (sometimes called an attenuation layer) may include protective material distributed throughout the helmet 100 in a desired fashion to absorb impact. The protective material is configured to undergo elastic deformation, and consequently absorb the most amount of energy possible from a collision, while returning to its original shape post-impact.

The comfort padding 120 may be attached to the protective padding 110. The purpose of the comfort padding 120 is to provide a soft area of contact with the user's head and in some cases absorb moisture. The comfort padding 120 may also provide a protection against low-energy impacts.

In some cases, it may be possible to remove or replace the comfort padding 120 of the helmet 100. However, the protective padding 110 is not meant to be removed or replaced by a user.

The comfort padding 120 may include a plurality of comfort pads in various strategic zones. For example, the comfort pads may include a frontal comfort pad 120F, an occipital comfort pad 120B and a pair of lateral comfort pads 120R, 120L. More or fewer comfort pads may be used. The comfort pads 120F, 120B, 120R, 120L may be fixedly or removably mounted to the protective padding 110.

For the purposes of simplicity, each comfort pad can be attributed a single thickness value, regardless of whether the thickness of the comfort pad is truly uniform. As such, when referring to "the thickness" of a given comfort pad, this can refer to the thickness throughout the given comfort pad (in the case of uniform thickness), the average thickness of the given comfort pad (in the case of non-uniform thickness), the thickness at a certain sample point of the given comfort pad (e.g., the center point) or the average of the thickness taken at several sample points of the given comfort pad, to name a few non-limiting possible scenarios.

Certification

In commerce, helmets are marketed to the public in multiple "size classes", such as small (S), medium (M) and large (L). In some markets, other size classes also exist, such as youth (Y), extra-large (XL), etc., and there may be separate sets of size classes for male and female players. Helmets that come in a limited number of predetermined size classes in a same helmet "line" (or "family") are referred to as mass-market or retail helmets because structurally identical copies of the helmet (in a given size class) are made by the hundreds or thousands and destined for end consumers. There may be some room for aftermarket variation, such as color, presence or absence of an ear protector, presence or absence of a cage, etc.; however, all helmets in a given size of a given line class are mostly indistinguishable from a structural standpoint.

To protect the public, it is typically the case that sports helmets (and hockey helmets in particular) sold in the marketplace must be certified by the manufacturer as having met a certain safety standard. Notable examples of safety standards include HECC, CSA Z262.1, ASTM F1045-90a and NOCSAE. These safety standards require that certain criteria be met as far as coverage areas, type and extent of the protective padding, strength and elongation ability of the chinstrap, and shock absorption are concerned.

Some safety standards specify a "minimum allowable thickness" of the interior padding and a "maximum allowable thickness" of the interior padding. In other words, the interior padding of a helmet sold to consumers must have a total thickness between the boundary values specified by the safety standard. These minimum and maximum allowable thicknesses may differ among size classes. Some safety standards may also require the interior padding to meet certain material, physical or chemical criteria.

The helmet manufacturer must therefore ensure that the interior padding has a thickness between the minimum and maximum allowable thicknesses specified by the standard. However, the helmet manufacturer can decide on the relative thickness of the protective padding (e.g., protective padding 110) and the comfort padding (e.g., comfort padding 120). Consideration should be given to the fact that insufficient comfort padding could be uncomfortable for the user, whereas insufficient protective padding may cause the helmet to not pass a test required for certification under the relevant safety standard.

To certify a given helmet "line" under a given safety standard, the manufacturer may supply a small number of sacrificial test helmets for testing purposes. These test helmets may be in the various size classes that the manufacturer intends to market in the given helmet line. The test helmets should cover the range of padding possibilities that are expected to be made available on the market. This range of padding possibilities corresponds to a range of lengths, widths and volumes of the helmet cavity.

Generally speaking, in a given size class, the thickness of the protective padding 110 may remain the same, and it is the comfort padding 120 that varies in thickness between a minimum comfort padding thickness (minimum cavity volume) and a maximum comfort padding thickness (minimum cavity volume). It is recalled that the overall thickness of the interior padding (i.e., protective padding+comfort padding) is required to be within the range of thicknesses allowed by the safety standard; however, it need not correspond precisely to either of the boundary values specified by the safety standard. It should be noted that if the helmet line is to be marketed as usable without any comfort padding, the minimum comfort padding thickness may be zero. This would mean that the entirety of the interior padding thickness is made up of the protective padding, whose thickness would need to be between the minimum and maximum allowable thicknesses specified by the safety standard.

Therefore, to test a helmet line that comes in 3 size classes (e.g., S, M, L), the manufacturer might provide 6 helmets, 2 for each size class. For the pair of helmets within a given size class, the thickness of the protective padding is the same, and the thickness of the comfort padding of one helmet is the minimum comfort padding thickness (maximum cavity volume for the given size class) and the thickness of the comfort padding of the other helmet is the maximum comfort padding thickness (minimum cavity volume for the given size class).

If the test helmets pass the test associated with the safety standard, it is inferred that any helmet in the given helmet line in a given one of the size classes with the same thickness of protective padding and with comfort padding having a thickness between the minimum and maximum comfort padding thicknesses (that have been tested for the given size class) would also pass the test, and for these reasons, they can be marketed as "certified". Such helmets can now be sold at retail and can be referred to as "retail" helmets in the given helmet line. The manufacturer can also specify the maximum and minimum thicknesses of the comfort padding that can be safely used with the helmet.

Adjustable Retail Helmet

In some cases, the retail helmets in a given helmet line have adjustable dimensions. With reference to FIGS. 2A to 2F, there is shown an adjustable retail helmet 200 in a given size class (e.g., S, M or L). The adjustable retail helmet 200 comprises a shell 205 to which is mounted inner padding 208. The inner padding 208 is disposed between the shell 205 and the user's head in use to absorb impact energy when the helmet 200 is impacted. More particularly, the inner padding 208 comprises a shock-absorbing structure 210 that includes an outer surface 38 facing towards the shell 205 and an inner surface 34 facing towards the user's head. The shock-absorbing structure 210 may include protective material distributed throughout the adjustable retail helmet 200 in a desired fashion to absorb impact. In some embodiments, the shock-absorbing structure 210 may comprise a plurality of pads $36_1$-$36_N$ to absorb impact energy. The pads $36_1$-$36_N$ are responsible for absorbing at least a bulk of the impact energy transmitted to the inner padding 208 when the helmet 200 is impacted and can therefore be referred to as "absorption" pads.

For example, in this embodiment, each of the absorption pads $36_1$-$36_N$ comprises a shock-absorbing material 50. For instance, in some cases, the shock-absorbing material 50 may include a polymeric cellular material, such as a polymeric foam (e.g., expanded polypropylene (EPP) foam, expanded polyethylene (EPE) foam, vinyl nitrile (VN) foam, polyurethane foam (e.g., PORON XRD foam commercialized by Rogers Corporation), or any other suitable polymeric foam material), or expanded polymeric microspheres (e.g., Expancel™ microspheres commercialized by Akzo Nobel). In some cases, the shock-absorbing material 50 may include an elastomeric material (e.g., a rubber such as styrene-butadiene rubber or any other suitable rubber; a polyurethane elastomer such as thermoplastic polyurethane (TPU); any other thermoplastic elastomer; etc.). In some cases, the shock-absorbing material 50 may include a fluid (e.g., a liquid or a gas), which may be contained within a container (e.g., a flexible bag, pouch or other envelope) or implemented as a gel (e.g., a polyurethane gel). Any other material with suitable impact energy absorption may be used in other embodiments. In other embodiments, a given one of the absorption pads $36_1$-$36_N$ may comprise an arrangement (e.g., an array) of shock absorbers that are configured to deform when the helmet 200 is impacted. For instance, in some cases, the arrangement of shock absorbers may include an array of compressible cells that can compress when the helmet 200 is impacted. Examples of this are described in U.S. Pat. No. 7,677,538 and U.S. Patent Application Publication 2010/0258988, which are incorporated by reference herein.

The shock-absorbing structure 210 may have any suitable thickness at any given point, such as between 5 mm and 40 mm, between 10 mm and 30 mm, or between 14 mm and 24 mm, without limitation.

In addition to the shock-absorbing structure 210, the inner padding 208 may comprise comfort padding 220. In a non-limiting embodiment, the comfort padding 220 may include a plurality of comfort pads $64_1$-$64_K$ which are configured to provide comfort to the user's head. In this embodiment, when the helmet 200 is worn, the comfort pads $64_1$-$64_K$ are disposed between the absorption pads $36_1$-$36_N$ and the user's head to contact the user's head. The comfort pads $64_1$-$64_K$ may comprise any suitable soft material providing comfort to the user. For example, in some embodiments, the comfort pads $64_1$-$64_K$ may comprise polymeric foam such as polyvinyl chloride (PVC) foam, polyurethane foam (e.g., PORON XRD foam commercialized by Rogers Corporation), vinyl nitrile foam or any other suitable polymeric foam material. In some embodiments, given ones of the comfort pads $64_1$-$64_K$ may be secured (e.g., adhered, fastened, etc.) to respective ones of the absorption pads $36_1$-$36_N$. In other embodiments, given ones of the comfort pads $64_1$-$64_K$ may be mounted such that they are movable relative to the absorption pads $36_1$-$36_N$. For example, in some embodiments, given ones of the comfort pads $64_1$-$64_K$ may be part of a floating liner as described in U.S. Patent Application Publication 2013/0025032, which, for instance, may be implemented as the SUSPEND-TECH™ liner found in the BAUER™ RE-AKT™ and RE-AKT 100™ helmets made available by Bauer Hockey, LLC. The comfort pads $64_1$-$64_K$ may assist in absorption of energy from impacts, in particular, low-energy impacts.

As in the embodiment shown in FIG. 26, the comfort pads may be placed in various strategic zones, and may include a frontal comfort pad 64F, an occipital comfort pad 64B and a pair of lateral comfort pads 64R, 64L. The comfort pads 64F, 64B, 64L, 64R fixedly or removably mounted to the shock-absorbing structure 210. In this embodiment, there are four comfort pads; however, more or fewer comfort pads may be used.

Each of the comfort pads 64F, 64B, 64L, 64R has a thickness that may be any suitable thickness, such as 1 mm to 20 mm, or 2 mm to 10 mm, if any comfort padding is used at all. The thickness of a given comfort pad can be uniform or it can vary along the extent of the given comfort pad and also depending on where in the adjustable retail helmet 200 the given comfort pad is located.

In this embodiment, the adjustable retail helmet 200 has a multi-piece shell 205 with a plurality of shell members $22_1$-$22_3$. As further described in, for example, U.S. patent application Ser. No. 16/764,453, filed Nov. 21, 2018, hereby incorporated by reference herein, one or more adjustment mechanisms 282, 284 on the shell 205 may allow adjustment of dimensional features such as a shell length and/or a shell width. In some embodiments, the shell length can be measured as the distance between the outer surface of the front part of the shell 205 and the outer surface of the rear part of the shell 205, whereas the shell width can be measured as the distance between the outer surfaces of the lateral parts of the shell 205.

Specifically, the adjustment mechanisms 282, 284 allow the fit of the helmet 200 to be adjusted by adjusting one or more dimensions of the adjustable retail helmet 200, including: (1) a longitudinal dimension (length) of the adjustable retail helmet 200 in the longitudinal direction of the helmet 200, such as a longitudinal dimension $D_{LS}$ of the shell 205 in the longitudinal direction of the adjustable retail helmet 200 and/or a longitudinal dimension $D_{LC}$ (length) of the cavity 13 of the adjustable retail helmet 200 in the longitudinal direction of the helmet; and (2) a lateral dimension (width) of the adjustable retail helmet 200 in the lateral direction of the adjustable retail helmet 200, such as a lateral dimension $D_{TS}$ (width) of the shell 205 in the lateral direction of the adjustable retail helmet 200 and/or a lateral dimension $D_{TC}$ (width) of the cavity 13 of the adjustable retail helmet 200 in the lateral direction of the adjustable retail helmet 200. This may allow the adjustable retail helmet 200 to better fit on the user's head, such as depending on the shape and/or the size of the user's head.

In this embodiment, the shell 205 and the inner padding 208 are adjustable by operating the adjustment mechanisms 282, 284 to adjust the fit of the adjustable retail helmet 200 on the user's head. More particularly, in this embodiment, the shell members $22_1$-$22_3$ are movable relative to one another, and respective ones of the absorption pads $36_1$-$36_N$ and comfort pads $64_1$-$64_K$ are movable relative to one another by operating the adjustment mechanisms 282, 284 to adjust the fit of the helmet 200 on the user's head. In this example, the adjustment mechanisms 282, 284 are configured to allow movement of the shell members $22_1$-$22_3$ relative to one another and movement of respective ones of the absorption pads $36_1$-$36_N$ and comfort pads $64_1$-$64_K$ relative to one another in the longitudinal direction of the adjustable retail helmet 200 and/or the lateral direction of the adjustable retail helmet 200.

More particularly, in this embodiment, the adjustment mechanisms comprise a longitudinal adjustment mechanism 282 configured to adjust the length $D_{LS}$ of the shell 205 and the length of the cavity 13 and a lateral adjustment mechanism 284 configured to adjust the width $D_{TS}$ of the shell 205 and the width $D_{TC}$ of the cavity 13. That is, the longitudinal adjustment mechanism 282 is configured to adjust the longitudinal dimension $D_{LS}$ of the shell 205 and the longitudinal dimension $D_{LC}$ of the cavity 13 of the adjustable retail helmet 200 such that each of the longitudinal dimension $D_{LS}$ of the shell 205 and the longitudinal dimension $D_{LC}$ of the cavity 13 of the adjustable retail helmet 200 is at least primarily (i.e., primarily or entirely) adjustable by operating the longitudinal adjustment mechanism 282, while the lateral adjustment mechanism 284 is configured to adjust the lateral dimension $D_{TS}$ of the shell 205 and the lateral dimension $D_{TC}$ of the cavity 13 of the adjustable retail helmet 200 such that each of the lateral dimension $D_{TS}$ of the shell 205 and the lateral dimension $D_{TC}$ of the cavity 13 of the adjustable retail helmet 200 is at least primarily (i.e., primarily or entirely) adjustable by operating the lateral adjustment mechanism 284.

In this example of implementation, the longitudinal adjustment mechanism 282 and the lateral adjustment mechanism 284 are operable independently from one another to adjust the length $D_{LS}$ of the shell 205 and the width $D_{TS}$ of the shell 205 independently from one another over at least part of a range of adjustability of the length $D_{LS}$ of the shell 205 and at least part of a range of adjustability of the width $D_{TS}$ of the shell 205, and/or to adjust the length $D_{LC}$ of the cavity 13 and the width $D_{TC}$ of the cavity 13 independently from one another over at least part of a range of adjustability of the length $D_{LC}$ of the cavity 13 and at least part of a range of adjustability of the width $D_{TC}$ of the cavity 13.

Since a key reason for providing a helmet that is adjustable is to better fit human heads of different dimensions, reference will frequently be made to the length and width of the helmet cavity 13. Thus, in the following, the "cavity length" can refer to the distance from the front comfort pad 64F to the occipital comfort pad 64B along an imaginary longitudinal centerline 51 of the adjustable retail helmet 200. Similarly, the "cavity width" can refer to the distance between the lateral comfort pads 64R, 64L along an imaginary transverse centerline 53 of the adjustable retail helmet 200. If there are no comfort pads, then the distances are measured from the inner edges of the shock-absorbing structure 210 of the adjustable retail helmet 200.

In the present embodiment, the first adjustment mechanism 282 is located in a posterior region of the adjustable retail helmet 200, and can be set to one of several (e.g., N, where N=2, 3, 4, 5, 6, etc.) available settings or positions or openings, each corresponding to a different length of the shell 205. The cavity length $D_{LC}$ will thus be related to the selectable length of the shell 205 by (i) the thickness of the shell 205; (ii) the thickness of the shock-absorbing structure 210; and (iii) the thickness of the comfort padding 220. In a non-limiting embodiment, the thickness of the shell 205 and the thickness of the shock-absorbing structure 210 will be fixed, i.e., not adjustable. In addition, consider that the adjustable retail helmet 200 is to be marketed with replaceable comfort pads in P thicknesses, where P=1, 2, 3 or higher. Thus, there will be P cavity lengths for each shell length setting.

The second adjustment mechanism 64, also located in the posterior region of the adjustable retail helmet 200, can be set to one of several (e.g., M, where M=2, 3, 4, 5, 6, etc.) available settings or positions or openings, each corresponding to a different width of the shell 205. The second adjustment mechanism 284 can include two sub-mechanisms 64A, 64B (one on each side of the helmet 200) that can be operated independently or together, depending on the embodiment. Purely for purposes of simplifying the present disclosure, it will be assumed that sub-mechanisms 64A, 64B are operated together to one of the M available shell width settings. The cavity width $D_{TC}$ will thus be related to the selectable width of the shell 205 by (i) the thickness of the shell 205; (ii) the thickness of the shock-absorbing structure 210; and (iiii) the thickness of the comfort padding 220. Consider again that the adjustable retail helmet 200 is to be marketed with replaceable comfort pads in P thicknesses, where P=1, 2, 3 or higher. Thus, there will be P cavity widths for each shell width setting.

For the purposes of illustration, let it be the case that P=2, i.e., the adjustable retail helmet 200 is to be marketed with replaceable comfort pads in 2 available thicknesses, and let the available comfort padding thicknesses include a first comfort padding thickness (e.g., 2 mm) and a second comfort padding thickness (e.g., 7 mm). Naturally, neither the number of available comfort padding thicknesses nor their values are to be considered a limitation of the present disclosure.

As such, there are N×M possible so-called instantiations (or "variants") of the adjustable retail helmet 200 in the given size class, each corresponding to a different combination of shell length setting and shell width setting. Form a parametric standpoint, the size class can be considered a "coarse helmet parameter", whereas the shell length setting and the shell width setting can be considered "fine helmet parameters", as they are adjustable for a given coarse helmet parameter (i.e., size class). Each of these helmet variants is associated with two possible cavity lengths and two possible cavity widths based on the fact that there are two available comfort padding thicknesses.

Since the user's head must fit into the helmet cavity 13 both length-wise and width-wise, the cavity length $D_{LC}$ for a given shell length setting and comfort padding thickness corresponds to the maximum length that the user's head is allowed to have at that shell length setting. Similarly, the cavity width $D_{TC}$ for a given shell width setting and comfort padding thickness corresponds to the maximum width that the user's head may have at that shell width setting. This correspondence applies in the absence of interference. If interference is tolerated (i.e., if it is permissible to compress the comfort padding 220 to squeeze the user's head into the helmet), then the user's head can be slightly longer than the cavity length, and similarly for the cavity width. Those of skill in the art should be capable of making any adjustments or conversions in order to account for a permissible amount of interference.

Conceptual Representation of Variants of Adjustable Retail Helmet

With reference now to FIG. 3, there is shown a graph 300 that plots cavity width (along the Y-axis) versus cavity length (along the X-axis), for the various variants of the adjustable retail helmet 200, which is available in 3 size classes (S, M, L). There are N=5 available shell length settings (producing N=5 possible values for the shell length) and M=5 available shell width settings (producing M=5 possible values for the shell width), for each size class. This enables 25 helmet variants per size class, each helmet variant corresponding to a respective set of data points in the graph 300.

In this case, each variant of the adjustable retail helmet 200 corresponds to a respective set of four data points 310A-310D. Specifically, for a given helmet variant characterized by a respective combination of the coarse helmet parameter (size class) and two fine helmet parameters (shell length setting and shell width setting), data point 310A in the graph 300 covers the case where all comfort pads 64F, 64B, 64R, 64L have the first comfort padding thickness (e.g., 2 mm). Data point 310B corresponds to the same given helmet variant, except that it covers the case where all comfort pads 64F, 64B, 64R, 64L have the second comfort padding thickness (e.g., 7 mm). It is noted that data point 310B is shifted downwards and to the left compared to data point 310A because it results in a shorter and narrower cavity. The remaining data points 310C, 310D cover the mixed cases where either the frontal and occipital comfort pads 64F, 64B have the first comfort padding thickness and the lateral comfort pads 64R, 64L have the second comfort padding thickness, or vice versa.

From the user's point of view, once an adjustable retail helmet is purchased in a given size class and with comfort pads having either the first or second comfort padding thickness, the user can adjust the cavity length (by setting the first adjustment mechanism to one of N=5 available shell length settings) and the cavity width (by setting the second adjustment mechanism to one of M=5 available width settings). The resulting cavity length and cavity width will map to one of the data points 310A-310D for the corresponding one of the 25 helmet variants for the given size class.

The graph 300 is based on data specifically associated with the helmet line to which the adjustable retail helmet 200 belongs. Analogous graphs created from data associated with other helmet lines would look similar but with some potential differences. For example, apart from differences in the actual coordinates (cavity length and cavity width) of the data points themselves, from one helmet line to another, the overall number of data points will vary as a function of the number of size classes, the number of available shell length settings, the number of available shell width settings and the number of available comfort padding thicknesses. Also, the delta in cavity length or cavity width corresponding to adjacent shell length settings or shell width settings, respectively, has an impact on the density of the graph 300.

Figure 3A:
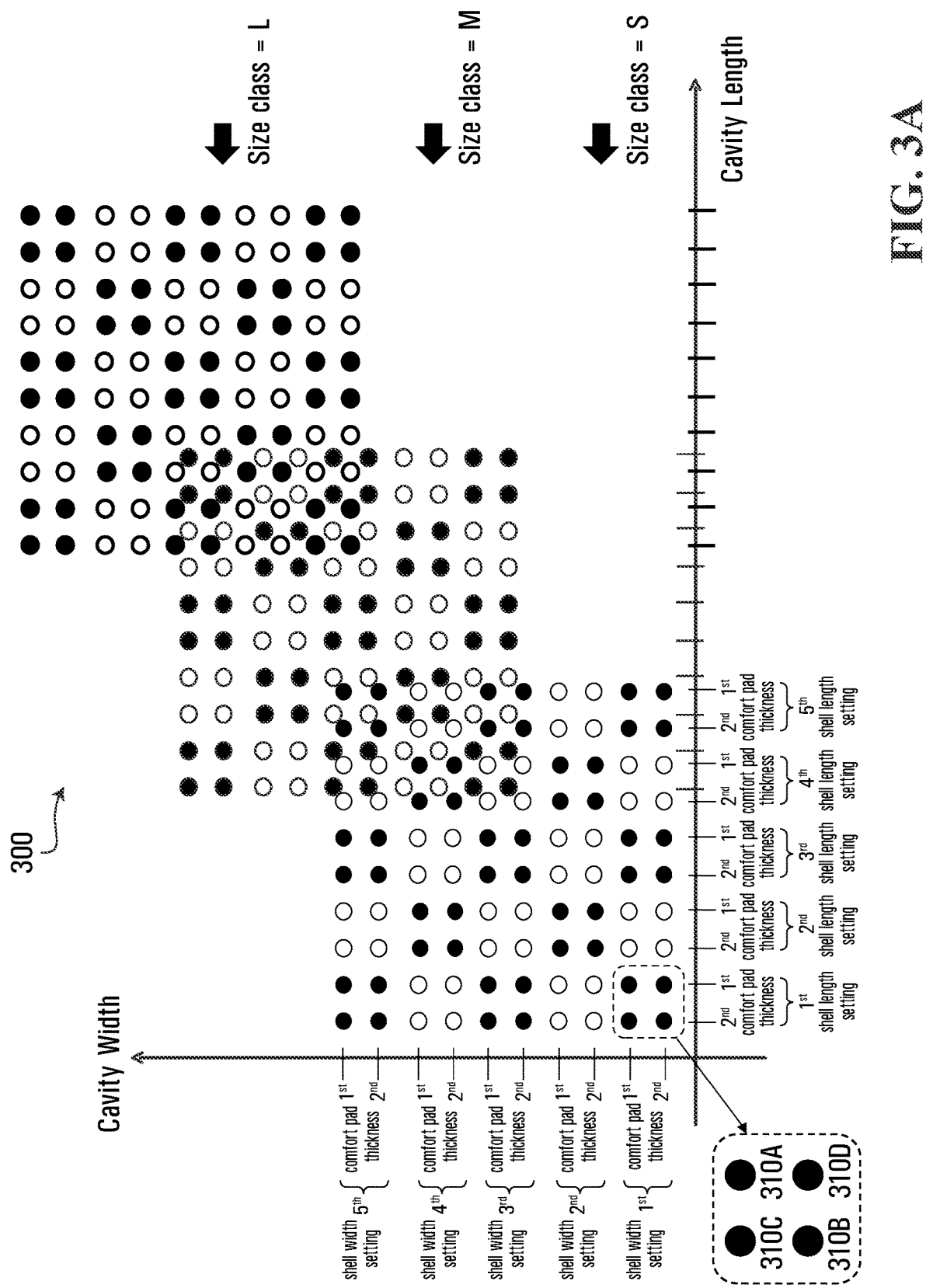
FIG. 3A is a graph conceptually illustrating the head dimensions that can be perfectly fit by feasible variants of the adjustable retail helmet in a given helmet line.
Figure 3B:
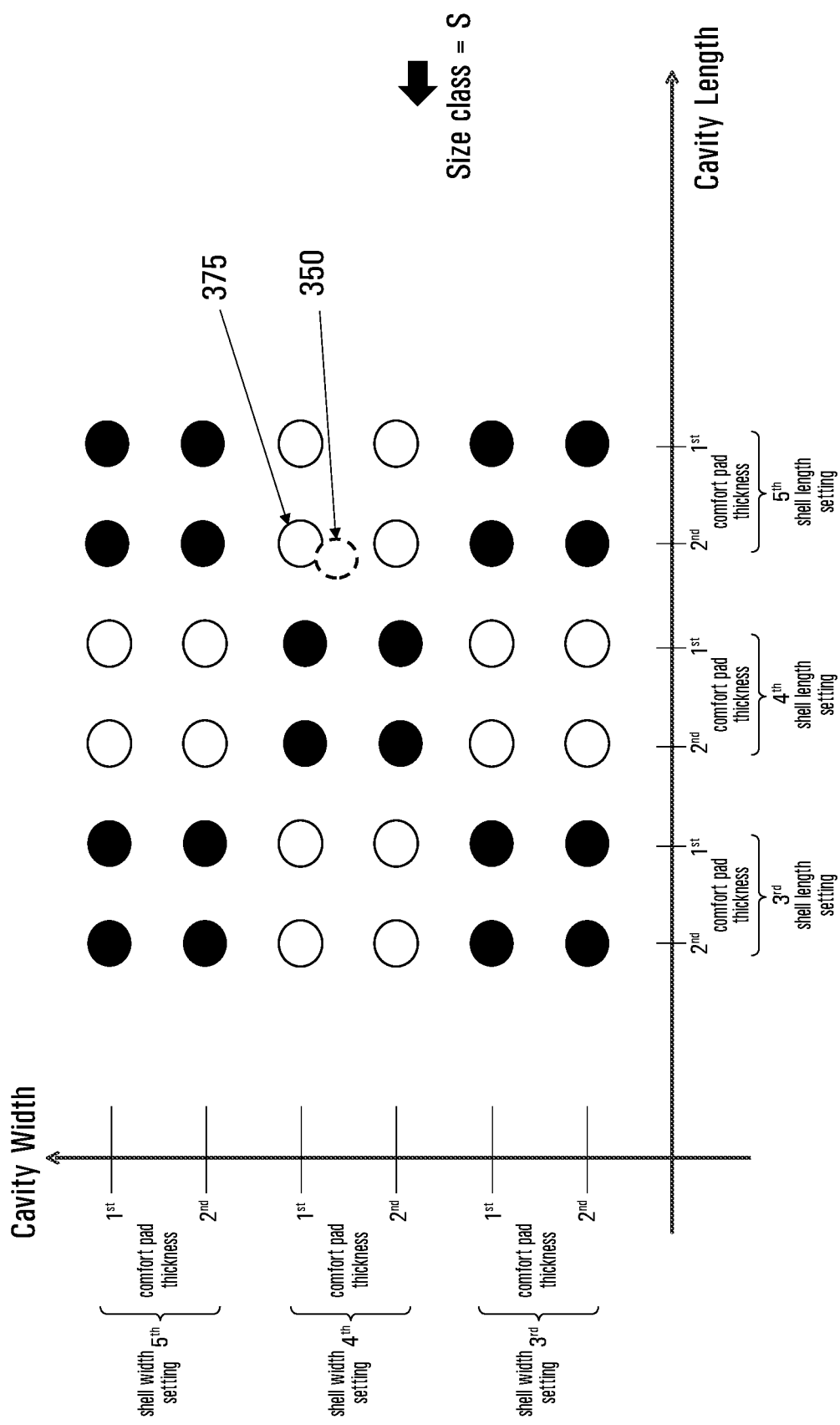
FIG. 3B is a zoomed-in view of the graph of FIG. 3A, showing closeness of fit with respect to dimensions of a particular user's head.

It can be observed from FIG. 3A that there is some overlap between the range of cavity lengths achievable via different available shell length settings of different size classes, and that there is also some overlap between the range of cavity widths achievable via different available shell width settings of different size classes.

Helmet Fit

At a conceptual level, it is possible to map the user's head onto the graph 300. Specifically, and with reference to FIG. 3B, which is a zoom-in on a region of the graph 300 of FIG. 3A, the length of the user's head is associated with a certain length and the width of the user's head is associated with a certain width, which results in coordinates of a data point 350 (a "user data point") in this graph 300. Generally speaking, the perceived helmet "fit" can be related to how close the user data point 350 is to one of the data points in the set of data points 310A-310D associated with a respective helmet variant. The closer the user data point 350 is to one of the data points 310A-310D on the graph, the better the helmet fit.

From a statistical point of view, the user data point 350 is unlikely to correspond exactly to one of the data points 310A-310D associated with an existing helmet variant. As such, the helmet fit is unlikely to be perfect in most cases; however, there may be several "candidate" data points for a somewhat acceptable fit. Each such candidate data point corresponds to a specific size class, shell length setting, shell width setting, thickness of the frontal/occipital comfort pads 64F/220B and thickness of the lateral comfort pads 64R/220L.

It should be apparent that data points 310A-310D in the graph 300 that are to the left of the user data point 350 correspond to combinations of coarse and fine helmet parameters (namely, size class and shell length setting) that would result in a helmet that is too short for the user's head; as such, these do not represent candidate data points. Similarly, data points 310A-310D that are below the user data point 350 correspond to combinations of coarse and fine helmet parameters (namely, size class and shell width setting) that would result in a helmet that is too narrow for the user's head, and therefore also do not represent candidate data points. This leaves as candidate data points (from the point of view of helmet fit) those data points that are to the right and/or above the user data point 350, yet still relatively "close" to the user data point 350.

In this particular case, data point 375 can be considered a candidate data point. Data point 375 corresponds to a specific size class (in this case S), to a specific shell length setting (in this case the $5^{th}$ shell length setting), to a specific shell width setting (in this case, the $4^{th}$ shell width setting), to a specific thickness of the frontal/occipital comfort pads 64F/220B (in this case, the $2^{nd}$ comfort padding thickness) and to a specific thickness of the lateral comfort pads 64R/220L (in this case, the $1^{st}$ comfort padding thickness).

It is contemplated that a single candidate data point 375 may be selected, namely the one that is closest to the user data point 350. By minimizing the distance between the user data point 350 and the candidate data point 365, this is equivalent to minimizing the gap between the user's head and the comfort padding of the helmet. This can be done by first computing, for a subset of variants and comfort padding thickness (i.e., for all or a subset of the data points 310A-310D), a function of (i) the difference between the head length and the cavity length for the variant and comfort padding thickness and (ii) the difference between the head width length and the cavity width for the variant and comfort padding thickness. This function could be the Euclidean distance, for example. It could also be a weighted distance, where length can have a greater relative importance than width, or vice versa. Other distance functions and algorithms can be used, without limitation. Once the distance has been computed for each variant and comfort padding thickness in the subset, the given variant and comfort padding thickness that yielded the minimum distance becomes the candidate data point 375. The given variant is also used as the variant corresponding to a base helmet for which a custom liner is designed, which combinedly produces a custom helmet, as now described in greater detail.

Custom Helmet

Figure 4A:
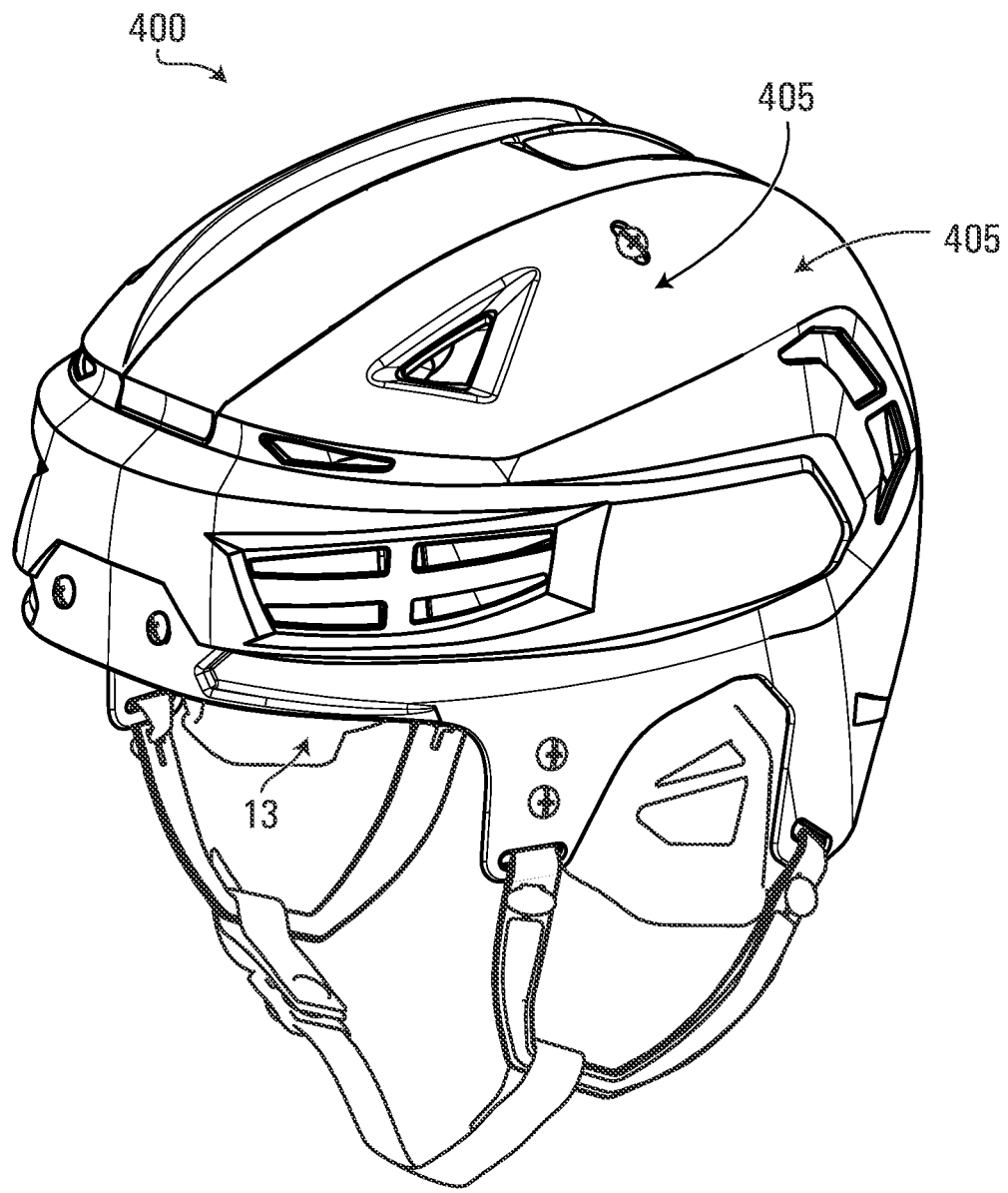
FIG. 4A is a perspective view of a custom helmet.
Figure 4B:
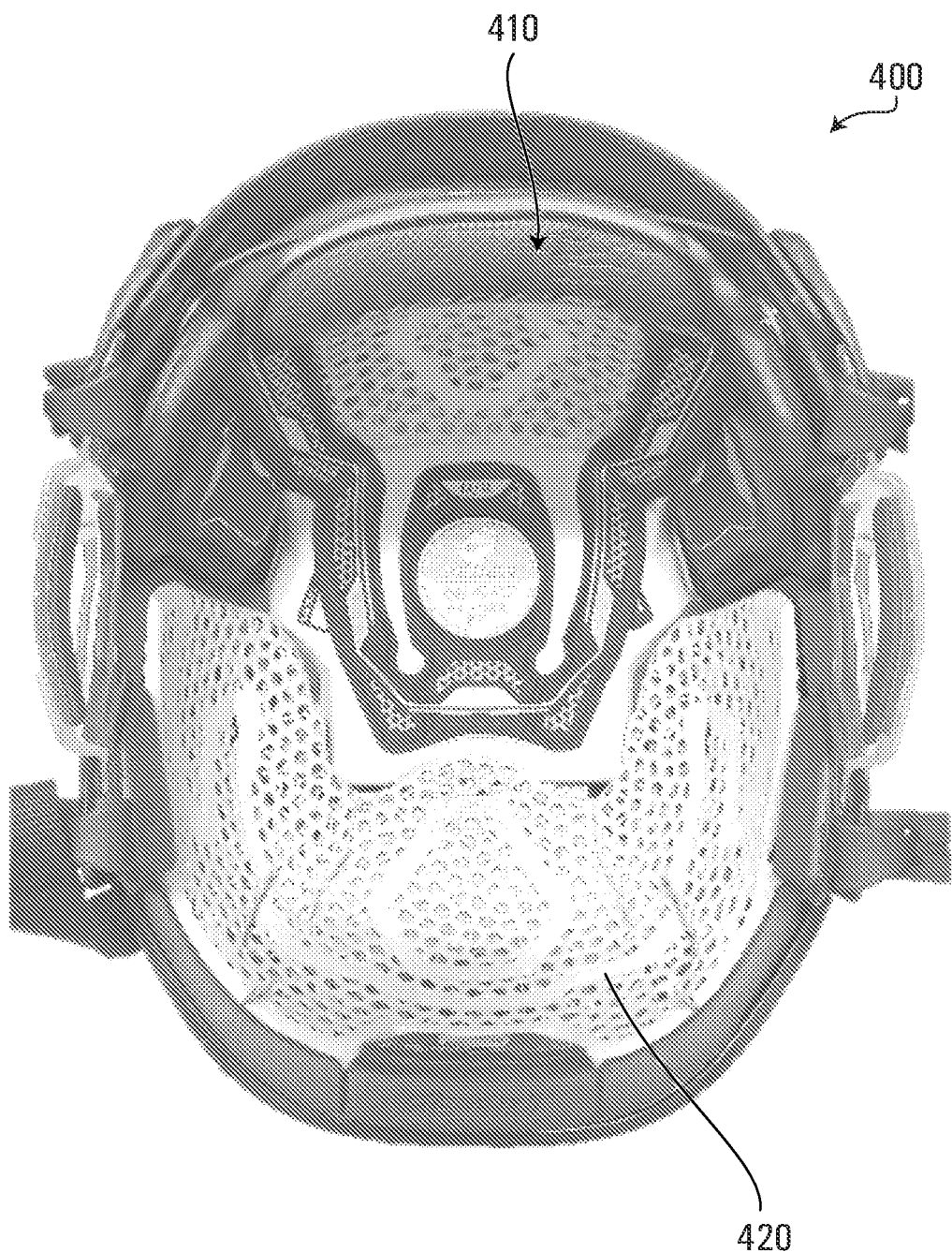
FIG. 4B is a bottom view of the custom helmet of FIG. 4A.
Figure 4C:
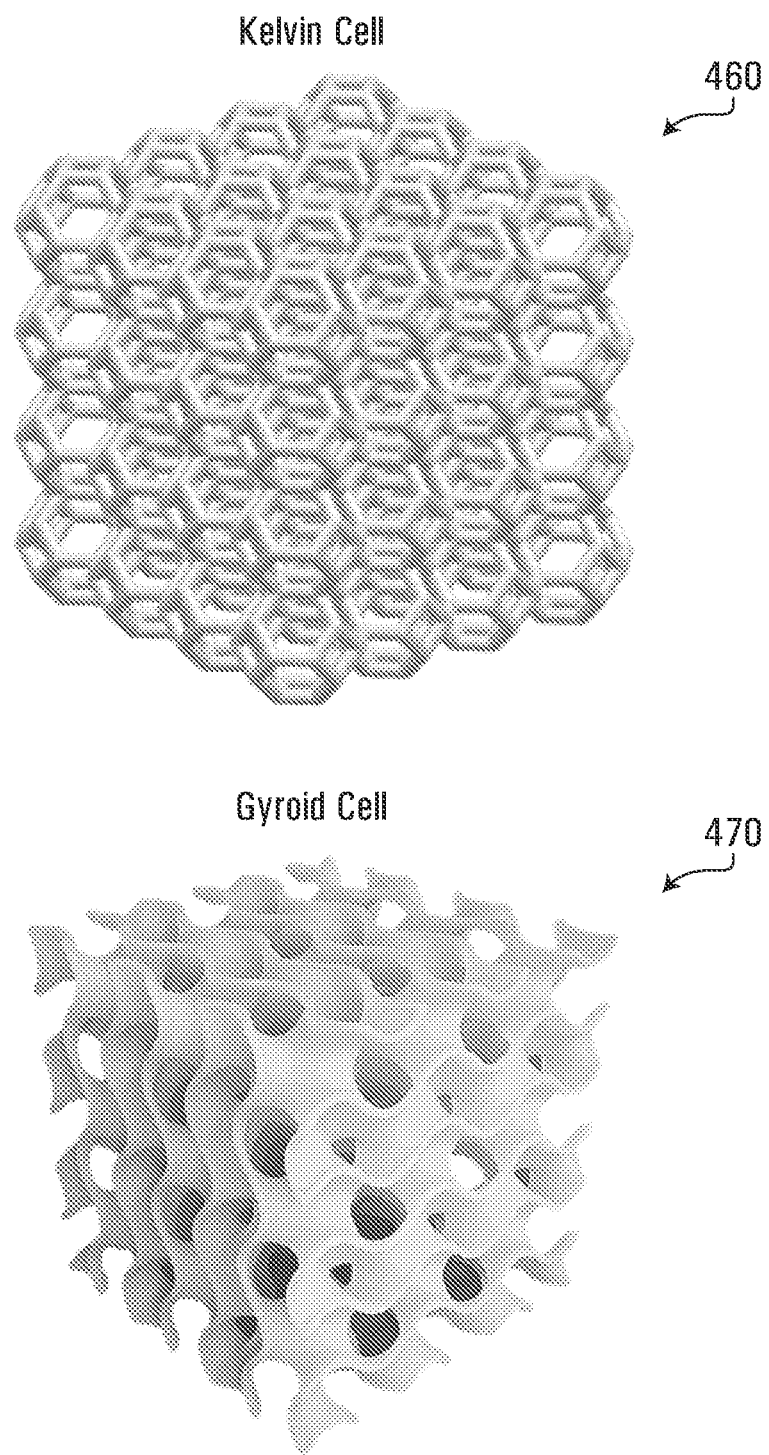
FIG. 4C shows 3D renderings of different non-limiting lattice structures that can be used in the custom helmet of FIG. 4A.

Reference is now made to FIGS. 4A to 4C, which show a non-limiting example of a "custom helmet" 400 that is designed to be in the same helmet line as the adjustable retail helmet 200. Because it is in the same helmet line as the adjustable retail helmet 200, the custom helmet 400 will have many of the same technical, design, material and performance attributes as the adjustable retail helmet 200.

For example, the custom helmet 400 may have a shell 405 made of the same material as the shell 205 of the adjustable retail helmet 200 that is considered certified. Also, the custom helmet 400 may include a shock-absorbing structure 410 made of protective material distributed throughout the custom helmet 400 in a manner similar to the way that the shock-absorbing structure 210 is distributed throughout the adjustable retail helmet 200. In this regard, the thickness and material of the shock-absorbing structure 410 of the custom helmet 400 may be the same as the thickness and material of the shock-absorbing structure 210 of the adjustable retail helmet 200.

However, there are some key differences between the custom helmet 400 and the adjustable retail helmet 200. For example, contrary to the adjustable retail helmet 200 discussed above, the shell 405 of the custom helmet 400 might not be adjustable. In some embodiments, this can enable the use of a one-piece shell, leading to a lighter-weight product.

Also, the custom helmet 400 incudes a custom-made comfort liner 420, based on measurements of a user's head. In non-limiting embodiments, the comfort liner 420 could be a continuous mesh of a latticed structure or several individual pieces of a latticed structure with a variable thickness that conforms to the user's unique head shape, rather than a set of prefabricated comfort pads with predetermined dimensions and thicknesses as was the case for the adjustable retail helmet 200.

The comfort liner 420 may be made using an additive manufacturing process, such as 3D printing, in which case the comfort liner 420 may include a 3D-printed material. In an example of implementation, the 3D-printed material may include polymeric material, such as polyamide (PA) 11, thermoplastic polyurethane (TPU) 30 A to 95 A (fused), polyurethane (PU) 30 A to 95 A (light cured, chemical cured), polyether ether ketone (PEEK), polyetherketoneketone (PEKK), polypropylene (PP), silicone, rubber, gel and/or any other polymer.

Recalling that the adjustable retail helmet 200 is deemed certified, and recognizing that the custom helmet 400 differs from the adjustable retail helmet 200 at least insofar as the comfort liner 420 is concerned, a key question is how to ensure that the custom helmet 400 will be considered certified upon manufacture.

To this end, the present disclosure contemplates designing the custom helmet 400 by leveraging the certification process already carried out with respect to the adjustable retail helmet 200. In particular, and according to a non-limiting embodiment, a specific variant of the adjustable retail helmet 200 is selected as a "starting point", and the custom comfort liner 420 is designed based on a 3D model of the selected variant of the adjustable retail helmet 200 (which can be referred to as a "base helmet"). If there are N×M variants of the adjustable retail helmet 200 and L size classes, there can be N×M×L potential starting points (or "base helmets") for the custom helmet 400.

Each such potential "starting point" (or base helmet) can be represented as a 3D model. This 3D model includes a shell with a shock-absorbing structure, to which a custom comfort liner can be attached, where the shell dimensions are characterized by a combination of one of the N shell length settings, one of M shell length widths and one of L size classes. The various combinations of shell length, shell width and size class are associated with respective variants of the adjustable retail helmet 200 which have already been certified.

Figure 14:
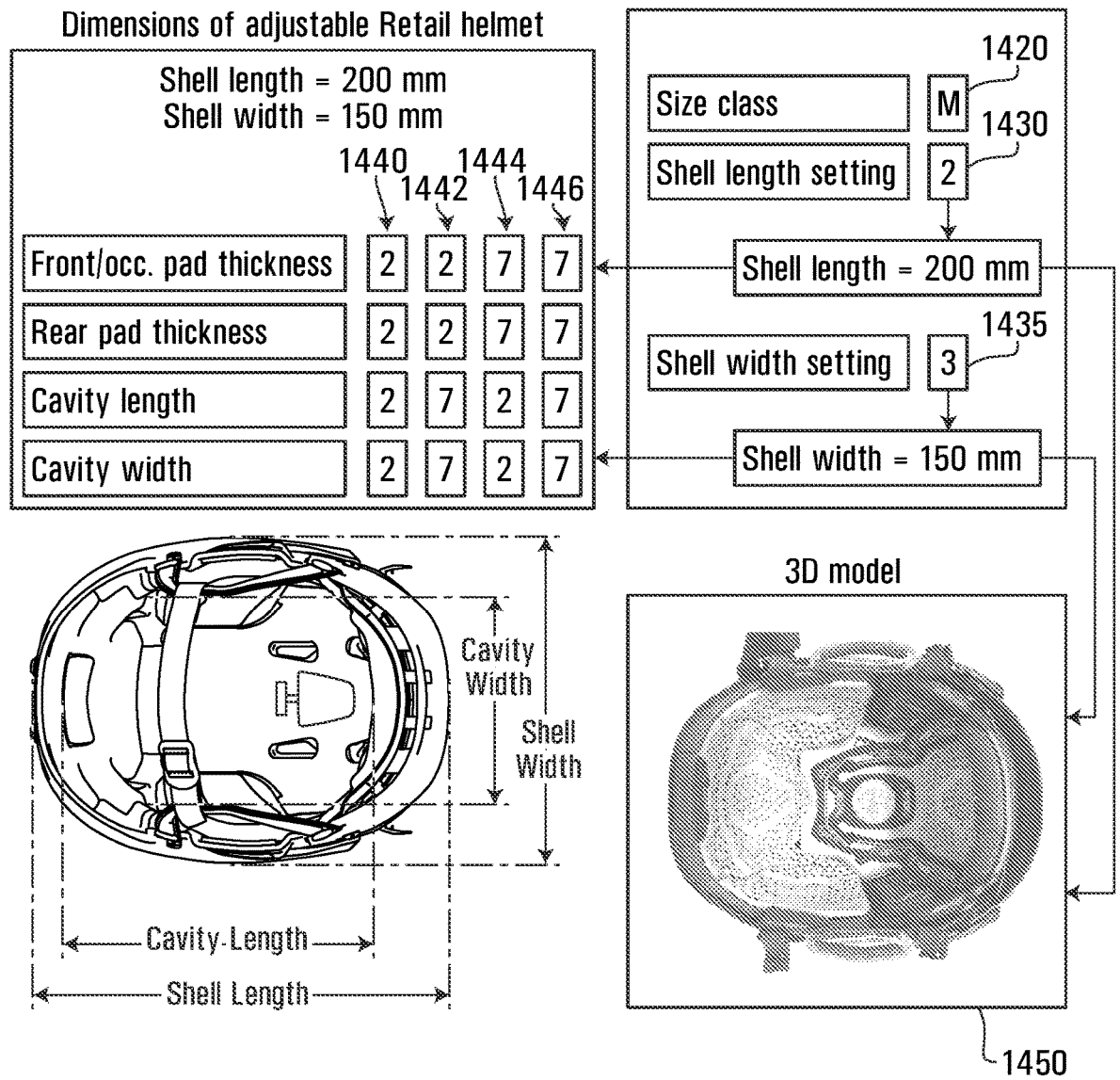
FIG. 14 is a block diagram conceptually illustrating the relationship between an adjustable retail helmet variant and a 3D model of a base helmet corresponding to that variant.

FIG. 14 illustrates the foregoing concept, namely the relationship between a variant of the adjustable retail helmet 200 in a particular helmet line, the related shell and cavity dimensions, and the related 3D model used as a "starting point"/base helmet for design of the custom comfort liner 420 and the custom helmet 400, in the particular helmet line. The fact that both the adjustable retail helmet and the custom helmet are in the same helmet line implies the existence of some common design elements. The variant (referred to as "XYZ") is represented by a data element 1410 comprising a plurality of parameters, including a coarse parameter 1420 (size class) and two fine parameters (shell length setting 1430 and shell width setting 1435). In this particular case, the size class is M, the shell length setting is #2 and the shell width setting is #4. These parameters result in a shell length of 200 mm and a shell width of 150 mm, for the M size class (i.e., "medium"), in this particular helmet line.

As such, to the left of the data element 1410 are shown the dimensions of an adjustable retail helmet in accordance with the first variant and four combinations 1440, 1442, 1444, 1446 of comfort padding thickness, which do not have an effect of the shell length or shell width, but do have an effect on the cavity length and cavity width. These four sets of cavity dimensions correspond to the four data points 310A-310D in graph 300.

To the right of the data element 1410 is shown a rendering of the 3D model 1450 characterized by the combination of shell length setting #2, shell width setting #4 and size class M. There is no comfort liner shown in the rendering of the 3D model 1450, as the comfort liner would be added after a customization phase is carried out, using the 3D model as a "starting point" (or "base helmet"). A custom helmet constructed in this way can be considered certified, if the custom liner meets certain dimensional criteria.

Figure 5:
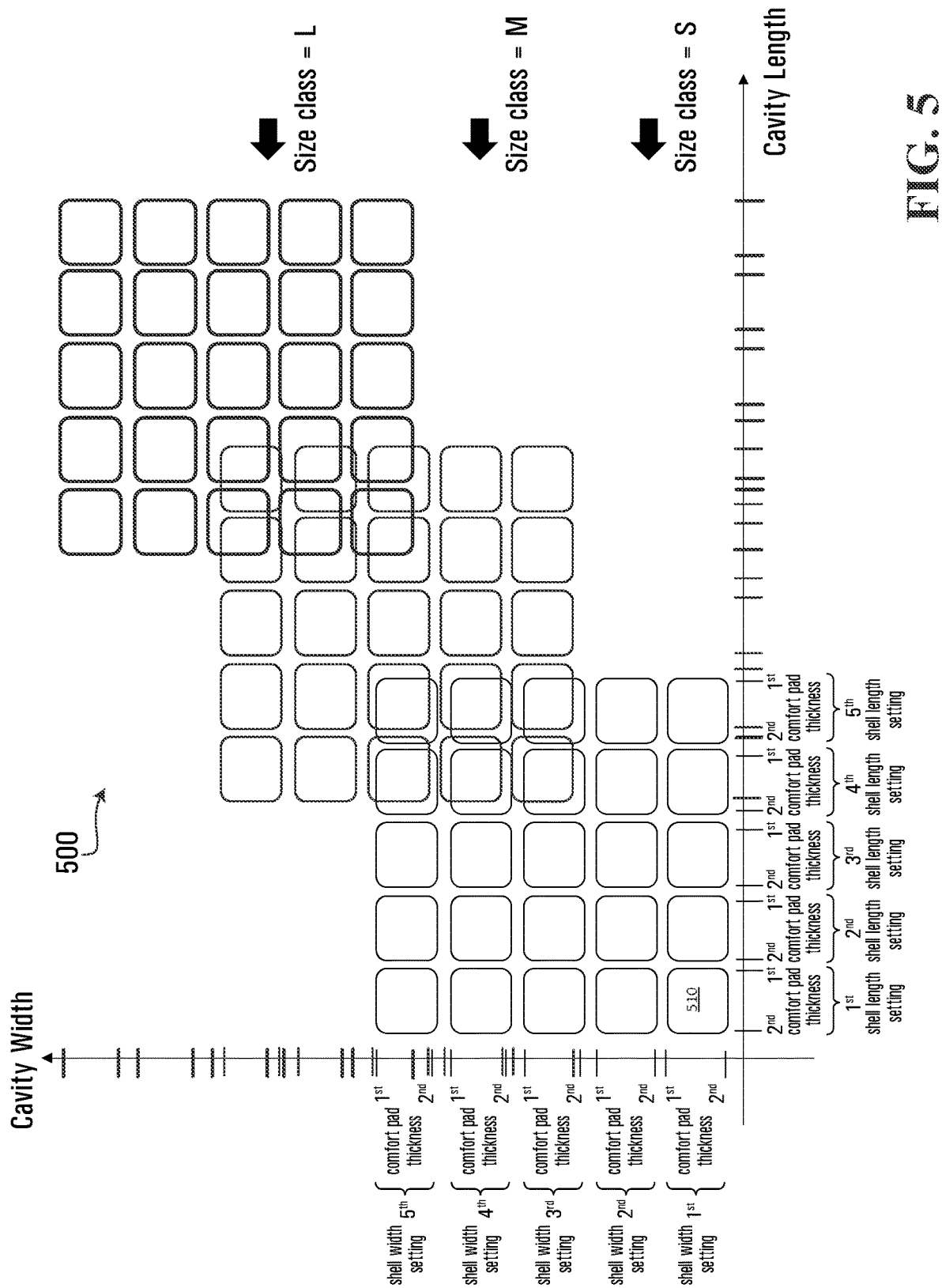
FIG. 5 is a graph conceptually illustrating the head dimensions that can be perfectly fit by a custom helmet that uses, as a starting point, the feasible variants of the adjustable retail helmet in a given helmet line.

In particular, and with reference now to FIG. 5, it is instructive to consider a version 500 of the aforementioned graph 300 of FIG. 3. Specifically, each set of four data points 310A-310D in the graph 300 is related to a corresponding "island" 510 in the graph 500, wherein:

The rightmost boundary of the island 510 corresponds to the maximum cavity length that was associated with the frontal and occipital comfort pads 64F, 64B (of the adjustable retail helmet 200) having the first comfort padding thickness.

The uppermost boundary of the island 510 corresponds to the maximum cavity width that was associated with the lateral comfort pads 64R, 64L (of the adjustable retail helmet 200) having the first comfort padding thickness.

The leftmost boundary of the island 510 corresponds to the minimum cavity length that was associated with the frontal and occipital comfort pads 64F, 64B (of the adjustable retail helmet 200) having the second comfort padding thickness.

The lowermost boundary of the island 510 corresponds to the minimum cavity width that was associated with the lateral comfort pads 64R, 64L (of the adjustable retail helmet 200) having the second comfort padding thickness.

It is recalled that each set of four data points 310A-310D in the graph 300 was associated with a respective variant of the adjustable retail helmet 200 (i.e., a particular shell length setting and a particular shell width setting in a particular size class). This association is preserved in graph 500, i.e., each of the islands 510 corresponds to a respective variant of the adjustable retail helmet 200.

This correspondence, together with the fact that the adjustable retail helmet 200 is certified in all of its variants, is what assists with certification of the custom helmet 400. In particular, it will be noted that in translating the user data point 350 from graph 300 to graph 500, then if this point ends up on a given one of the islands, it should be possible to achieve a perfect fit for the custom helmet 400 by using the 3D model of the variant of the adjustable retail helmet 200 corresponding to the given island as a "starting point", and by designing the customer liner 420 to perfectly fit the user's head.

As such, the union of all islands 510 represents the set of all combinations of cavity length and cavity width for which it is possible to produce a perfectly fitting certified custom helmet, by using the 3D model of one of the (already certified) variants of the adjustable retail helmet 200 as a starting point (a "base helmet"), and designing a perfectly fitting comfort liner.

Stated differently, if a user data point associated with the dimensions of a user's head falls onto one of the islands, a custom helmet with a perfect fit can be made for the user, and the custom helmet 400 will be considered certified, because that island corresponds to a variant of the adjustable retail helmet 200 that is already considered certified.

Figure 6:
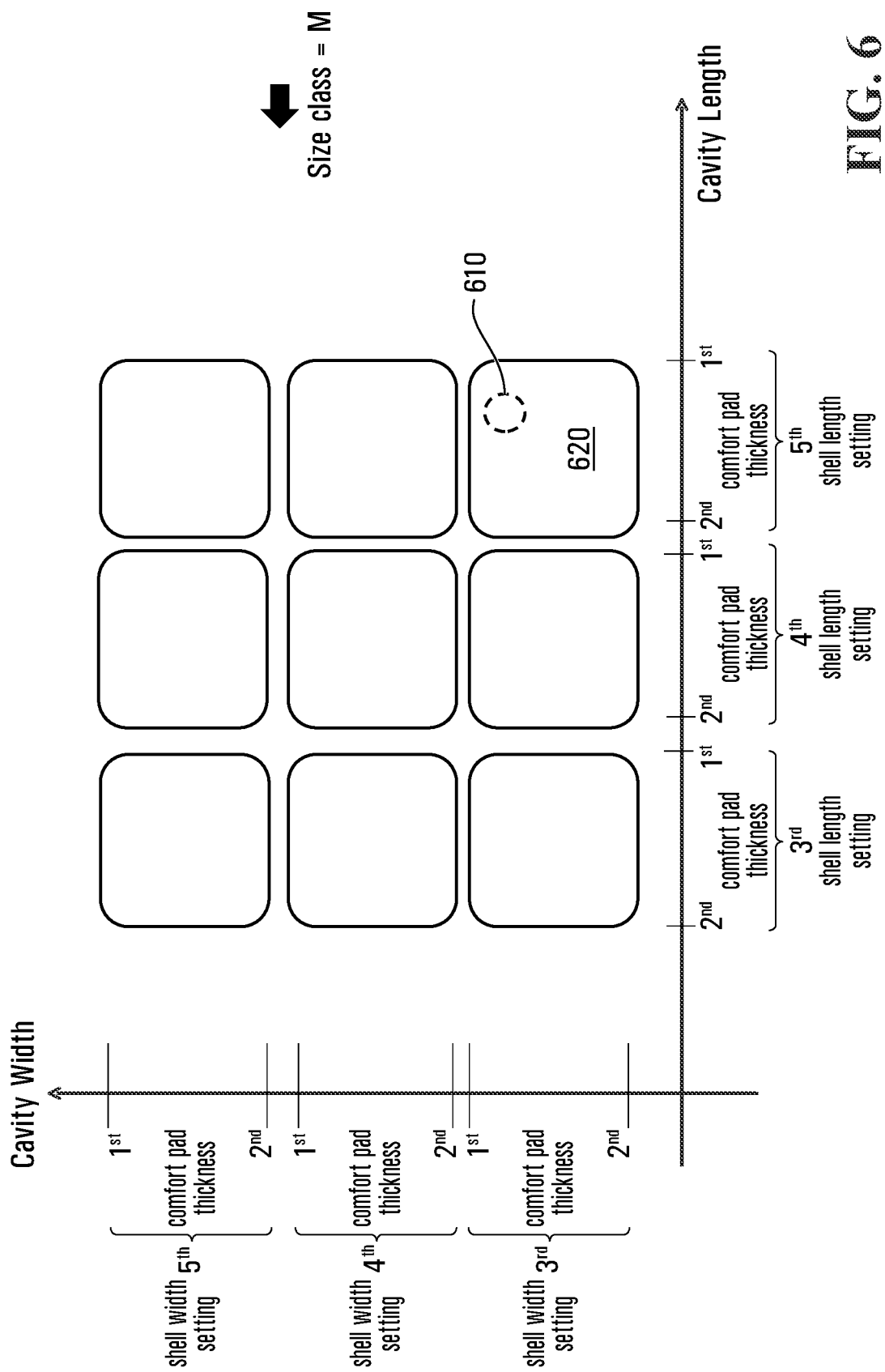
FIG. 6 is a zoomed-in view of the graph of FIG. 5, showing closeness of fit with respect to dimensions of a particular user's head.

For example, and with reference to FIG. 6, a user data point 610 is associated with the dimensions of a user's head is shown. The user data point 610 falls onto an island 620 associated with a variant of the adjustable retail helmet 200 corresponding to a size class M, to the $5^{th}$ shell length setting and to the $3^{rd}$ shell width setting.

Figure 7:
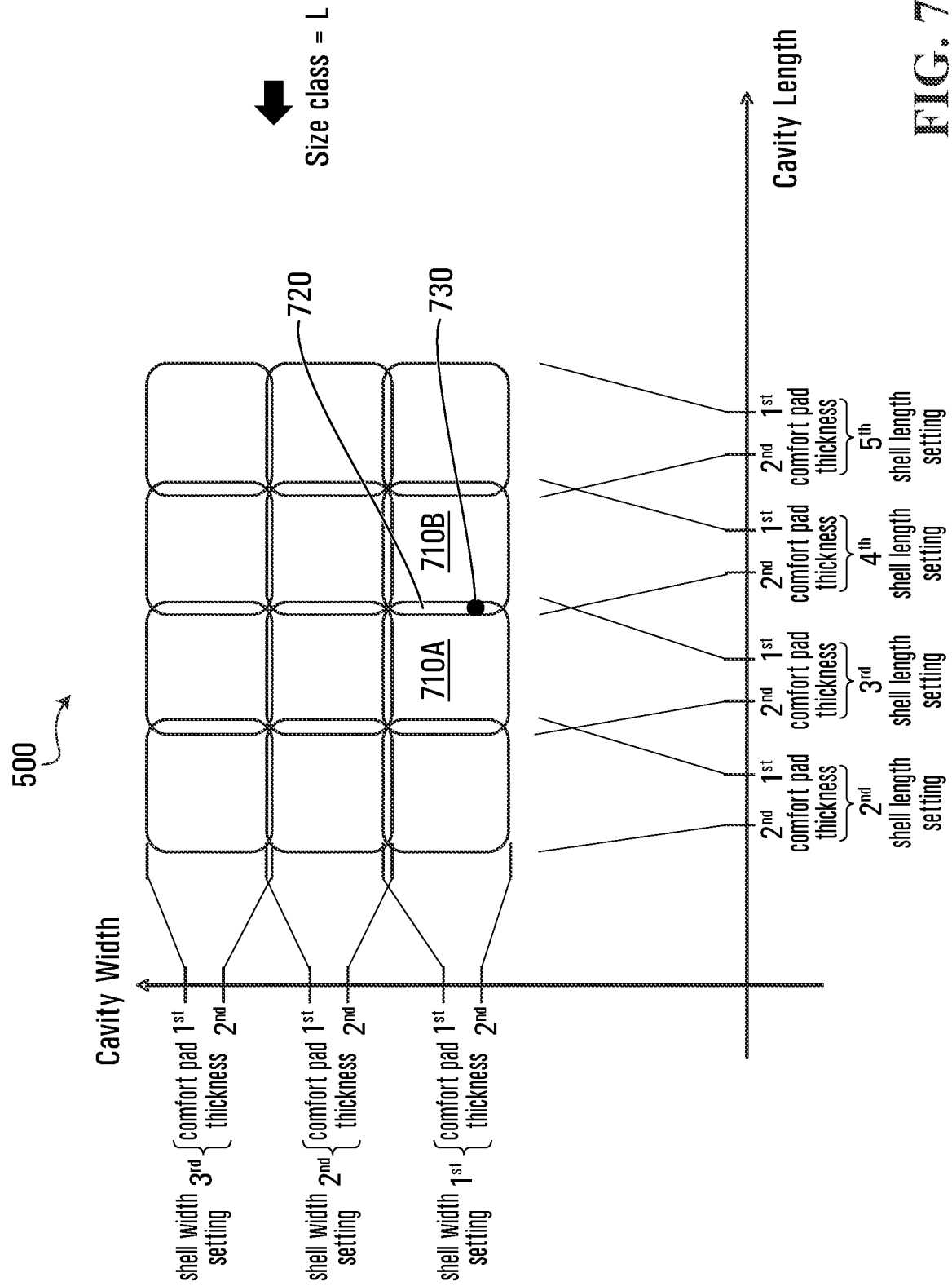
FIG. 7 is a portion of a graph similar to the graph of FIG. 5, but showing intersections in which more than one adjustable retail helmet variant provides a perfect fit for a user's head having dimensions that fall in the intersection.

It is further noted that in some cases, adjacent islands may overlap. With reference to FIG. 7, for example, consider island 710A (associated a variant "A" of the adjustable retail helmet 200 corresponding to a class size L, to the $3^{rd}$ shell length setting and to the $1^{st}$ shell width setting) and island 710B (associated with a variant "B" of the adjustable retail helmet 200 corresponding to a class size L, to the $4^{th}$ shell length setting and to the $1^{st}$ shell width setting). Islands 71A and 710B intersect, forming an intersection 720. The intersection 720 defines a common range of (in this case) cavity lengths. This implies that the range of available comfort padding thicknesses (for the adjustable retail helmet 200) was rather large. It may happen that a user data point 730 associated with the dimensions of a user's head falls into the intersection 720. In this case, it may be possible to achieve a perfect fit for the user's head by designing a thinner comfort liner for a custom helmet based on variant A of the adjustable retail helmet 200 and a much thicker comfort liner for a custom helmet based on variant B of the adjustable retail helmet 200, yet both resulting custom helmets would be considered certified.

Head Circumference

In the above embodiments, the measured dimensions of the user's head included a head length and a head width. In other embodiments, the measured dimensions of the user's head could also include a head circumference measured at a certain elevation (e.g., at the temples). Clearly, head shapes exist for which the head length and head width are kept constant, but for which the head circumference is different. In particular, for a given head length and head width, the "rounder" the head, the smaller the head circumference and the "squarer" the head, the greater the circumference.

In the above embodiments, the head length and the head width were used to select a variant of the adjustable retail helmet having a certain cavity length and a cavity width. Specifically, the head length and the head width were mapped to a size class, a shell length setting and a shell width setting that together define the selected variant. A thickness of the comfort pads was then chosen for the selected variant or a comfort liner was then designed using the selected variant as a starting point.

In other embodiments, the head circumference can also be used for selecting the appropriate variant of the adjustable retail helmet in the specific helmet line. This is because certain helmet lines may tend to fit a "round" head better than a "square" head or vice versa. This could be a result of the volumetric features of the shell, the material of the shell, distribution and thickness of the shock-absorbing material within the shell, and/or possibly other factors, that are characteristic of the specific helmet line.

As such, not only do the head length and head width influence the choice of the selected variant, but so too can the head circumference. In particular, the head length, head width and head circumference are mapped to a size class, a shell length setting and a shell width setting defining the selected variant. Although there may not be a separate helmet adjustment mechanism or setting to independently accommodate different head circumferences, the value of the head circumference may impact the relationship between the shell length setting and the shell width setting for the given user, and the extent of this impact may depend on the specific helmet line. For example, the shell length setting and the shell width setting can be constrained such that the ratio of the resulting shell length to the resulting shell width falls within a certain predefined range associated with the head circumference.

System

Figure 8:
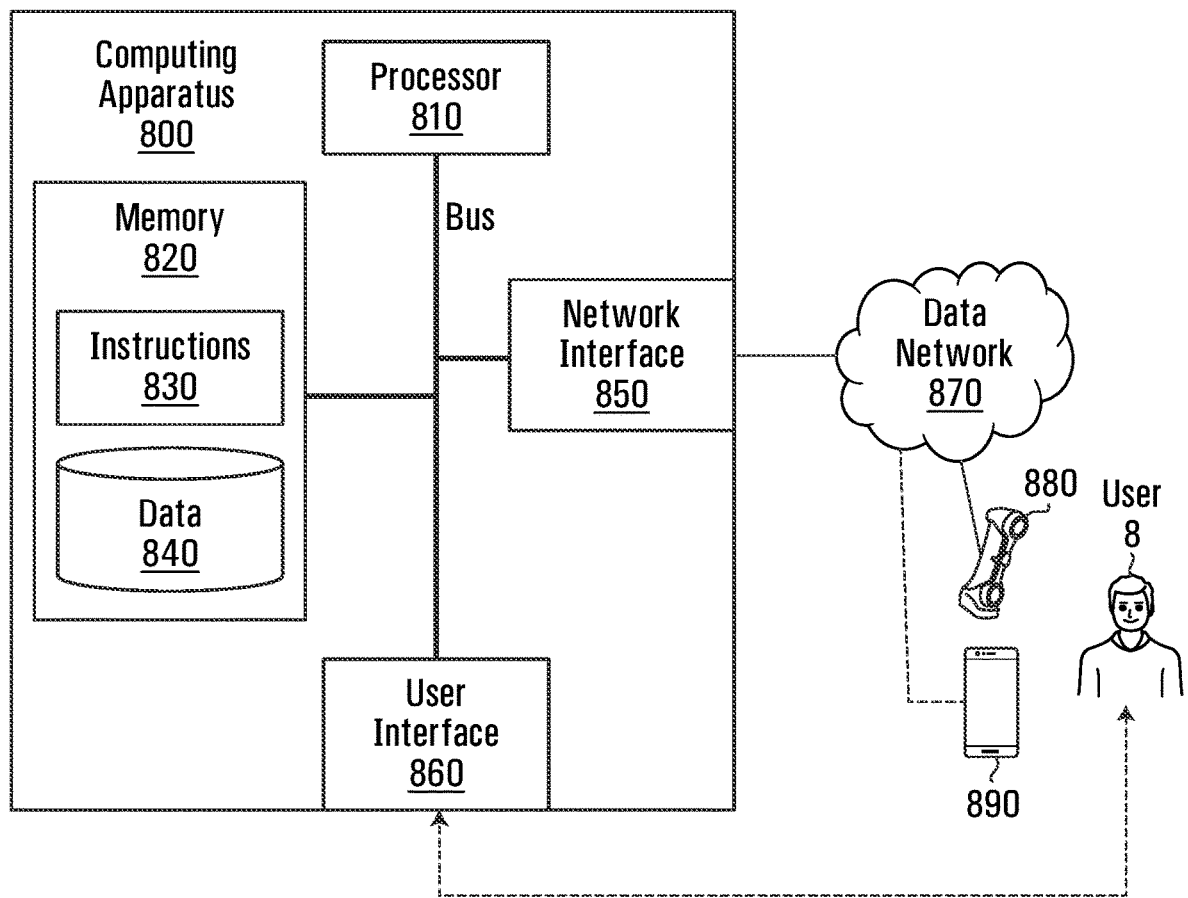
FIG. 8 is a block diagram showing a system for carrying out various methods described herein.

Reference is now made to FIG. 8, which shows a system for assisting a user 8 in selecting and/or customizing a helmet. The system comprises computing apparatus 800 connected to a scanning apparatus. The computing apparatus 800 could be implemented in a retail kiosk, a smartphone, a laptop, a desktop computer, a tablet or a mainframe, to name a few non-limiting possibilities. In some embodiments, the scanning apparatus could be embodied as a 3D scanner 880, for example as made by Creaform, Inc. of Lévis, Québec, Canada. In other embodiments, the scanning apparatus could be embodied as a smartphone 890 equipped with a camera and suitable photogrammetric software for creating a 3D scan from captured 2D images.

The scanning apparatus is communicatively coupled the computing apparatus 800. For example, the scanning apparatus can be connected to the computing apparatus 800 via a data network 870, suggesting that the user 8 whose head is being scanned need not be at the same physical location as the computing apparatus 800. The network 870 may include the Internet, a local area network, a wide area network and/or a wireless network. The network 870 may comprise copper transmission cables, optical transmission fibers, wireless transmission, routers, firewalls, switches, gateway computers and/or edge servers.

The computing apparatus 800 comprises, inter alia, a processor 810, a memory 820, a network interface 850 and a user interface 860. The aforementioned components may be interconnected by a communication bus. The user interface 860 may include a graphical user interface (GUI), such as a display and/or a touchscreen.

The memory 820 may be a non-transitory memory medium that stores instructions 830 and also stores data 840. The memory medium may be, but is not limited to, an electronic storage device, a magnetic storage device, an optical storage device, an electromagnetic storage device, a semiconductor storage device, or any suitable combination of the foregoing. A non-exhaustive list of more specific examples of the memory medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, does not include transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The instructions 830 include computer-readable program instructions that define operation of the processor 810. The program instructions can be downloaded to the memory 820 from an external computer or external storage device via the network interface 850. The network interface 850, which can be embodied as a network adapter card or other network interface, can receive the program instructions over the network 870 and forward them to the memory 820 for storage and execution by the processor 810.

The program instructions may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the program instructions by utilizing state information to personalize the electronic circuitry, in order to carry out aspects of the present disclosure.

Execution of the program instructions by the processor 810 results in the computing apparatus 800 carrying out aspects of the present disclosure, such as one or more processes. The data 840 stored in the memory 820 comprises data needed to support execution of the one or more processes executed by the processor 810. As such, the data could include various combinations and associations of size classes, shell length settings, shell width settings, cavity widths, cavity lengths, head widths, head lengths, head circumferences and 3D models, in a variety of helmet lines, together with user data, account data and other data.

Helmet Selection

Figures 9, 10A:
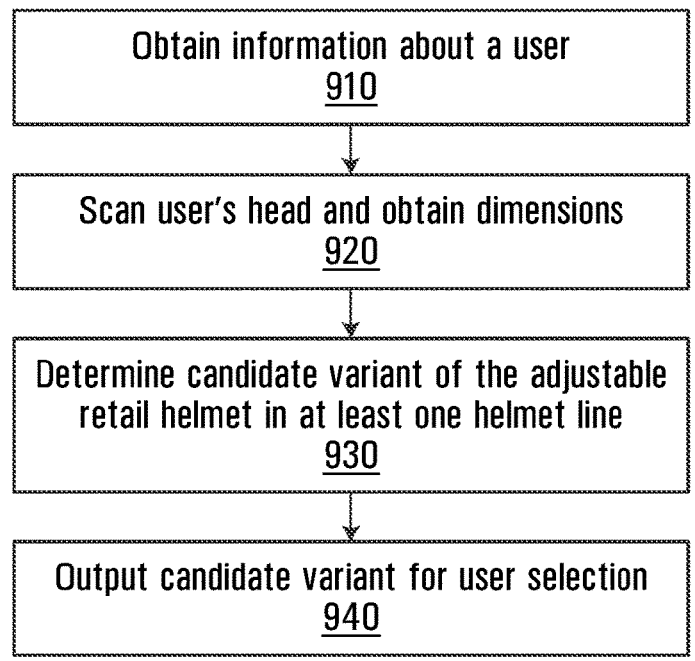
FIG. 9 is a flowchart showing a helmet selection/customization process that can be carried out by the system of FIG. 8, in accordance with a non-limiting embodiment.
FIG. 10A is a screenshot of a screen that can provide a user with an opportunity to enter relevant information.

One of the processes carried out by the computing apparatus is a helmet selection process, now described with additional reference to the flowchart in FIG. 9 and with additional reference to FIGS. 10A-10D.

Step 910:
  Information about the user 8 (i.e., "user information") is obtained. In some cases, the user information can be obtained via the user interface 860 (which can be implemented as a touchscreen at a retail kiosk or point-of-sale console, for example), whereas in other cases the user information can be obtained via the network interface 850 (in the case where the user 8 enters the user information via the smartphone 890). The user information is stored as part of the data 840 in the memory 820.
  With reference to FIG. 10A, there is shown a screenshot 1000 illustrating the types of user information that can be obtained at step 910. Specifically, the user information can include the user's name, address, height and weight. The user information can also include the user's gender (male or female). The user information can also include the user's skill level, in accordance with a certain number of skill levels. The displayed skill levels (beginner, intermediate, competitive, elite) are not to be considered limiting. The user information can further include one or more key performance attributes (KPAs) examples of which can include adjustability, weight, protection and profile. The helmet selection process can provide the user 8 with the opportunity to select several KPAs and to rank them (shown as KPA1 and KPA2).

Other user information obtained at step 910 could include the user's age category (e.g., youth, junior, senior).

Step 920:

Dimensions of the user's head are obtained. Firstly, and with reference to FIG. 10B, a 3D scan of the user's head is performed, so as to obtain a 3D model of the user's head (referred to as the user's headform). A rendering of the user's headform is shown at 1010. The 3D scan may be performed while the user 8 wears a cap or bonnet to keep the user's hair as close to the skull as possible. The user's headform 1010 can be stored as a file in a suitable file format, such as FBX, OBJ, USDZ, STL and STP, to name a few non-limiting possibilities. The dimensions of the user's head can then be based on the user's headform 1010. Specifically, the dimensions of the user's head can include the head length and the head width, and may also include the head circumference and the head height. In order to obtain the most accurate measurements possible, and with reference to FIG. 10C, the helmet selection process can present a window 1040 asking the user 8 to place certain markers on the user's headform 1010 via the user interface 860. The markers can include any or all of a right eye marker 1030A, a left eye marker 1030B, a nose root marker 1030C, a sub-nasal marker 1030D and a chin base marker 1030E. These markers are then used by the helmet selection process to determine a suitable plane of elevation for measurement of the head width, head length and head circumference. These markers are also used for centering 3D helmet models on the headform 1010.

In another embodiment, the helmet selection process can use an artificial intelligence algorithm to automatically place the markers 1030A-1030E on the headform 1010.

Step 930:

The data 840 stored in the memory 820 is consulted to determine at least one suggested variant in at least one helmet line, for the head dimensions obtained at step 920. It is recalled that a suggested variant refers to a shell length setting, a shell width setting and a size class of the adjustable retail helmet 200 (in a given helmet line). The overall number of suggested variants to be determined at step 930 can be set to a certain number of variants and/or helmet lines. For example, step 930 could result in identifying in a maximum of 3 suggested variants, each of these being the closest fitting variant in each of at most 3 helmet lines.

It is recalled that the data 840 stored in the memory 820 can be viewed conceptually as the set of data points 310A-310D defining a graph (such as the graph 300) for each helmet line. The coordinates of each data point can be a cavity length and a cavity width. Each data point is further associated with a respective variant corresponding to a particular combination of shell length setting, shell width setting and size class, as was shown in FIG. 14.

Thus, to identify a suggested variant (in a given helmet line), step 930 can involve consulting the data 840 in the memory 820 and comparing it to the head dimensions obtained at step 920. Conceptually, this may involve finding the user data point 350 corresponding to the head dimensions obtained at step 920 and then determining which data point (in the graph 300 for the given helmet line) is closest to the user data point. It should be noted that to determine the data point (among the data points 310A-310D in the graph 300 for the given helmet line) is closest to the user data point 350 may involve finding which data point 310 has coordinates corresponding both to a cavity length that is closest to (without being less than) the length of the user's head and to a cavity width that is closest to (without being less than) the width of the user's head. The variant associated with the determined data point is selected as the suggested variant, in the given helmet line.

A score may also be associated with the suggested variant. The score could be affected by terms such as the relative (e.g., %) difference between the measured head length and the shell length resulting from the shell length setting associated with the suggested variant and the relative (e.g., %) difference between the measured head width and the shell width resulting from the shell width setting associated with the suggested variant.

The score associated with the suggested variant may also be affected by certain other factors, such as skill level (e.g., beginner, intermediate, competitive, elite) and/or key performance attributes (e.g., desiderata such as adjustability, weight, protection and profile), as may have been entered by the user at step 910 via the display 1000.

In a non-limiting example, the score may be out of 100, where the % difference between the measured head length and the shell length associated with the suggested variant and the % difference between the measured head width and the shell width associated with the suggested variant accounts for X % of the score. Additionally, Y % of the score (where Y≤100−X) could be attributed to the skill level and the remaining (100−X−Y) % of the score could be attributed to a weighted sum of the key performance attributes. It should be appreciated that the values of X and Y can vary. It should also be noted that, among different helmet lines, the score associated with different skill levels could vary, as could the weight associated with individual key performance attributes.

This is shown by way of non-limiting example in Tables 1 and 2 below, for 4 different helmet lines, where the 75% of the score is attributed to % differences in the length and width, and the remaining 25% of the score is attributed to the skill level and KPAs.

Specifically, Table 1 shows a skill level sub-score (out of 10) attributed to the skill level of the user, for the different helmet lines. The implication is that different helmet lines are inherently considered better suited to players of different skill levels.

Table 2 shows a KPA sub-score (out of 15) in the case where the user is allowed to specify two key performance attributes (in order of importance). The KPA sub-score is then computed as the sum of: the value (out of 10, as shown in Table 2) of the higher-ranked of the two selected key performance attributes and half of the value (also out of 10, as shown in Table 2) of the other ranked key performance attribute, for a maximum possible KPA sub-score of 15. It is noted that the combination of key performance attributes leading to the maximum sub-score will differ, depending on the helmet line.

TABLE 1

| | SKILL LEVEL | | | |
| --- | --- | --- | --- | --- |
| | Elite | Competitive | Developing | Beginner |
| Helmet Line #1 | 10 | 6 | 6 | 4 |
| Helmet Line #2 | 8 | 8 | 8 | 6 |
| Helmet Line #3 | 6 | 10 | 10 | 8 |
| Helmet Line #4 | 4 | 6 | 10 | 10 |

TABLE 2

| | KEY PERFORMANCE ATTRIBUTE | | | |
| --- | --- | --- | --- | --- |
| | Adjustability | Weight | Protection | Low Profile |
| Helmet Line #1 | 10 | 10 | 4 | 10 |
| Helmet Line #2 | 8 | 8 | 6 | 8 |
| Helmet Line #3 | 4 | 4 | 10 | 4 |
| Helmet Line #4 | 6 | 6 | 8 | 6 |

The above exercise can be repeated for multiple helmet lines (in sequence or in parallel), providing a suggested variant of the adjustable retail helmet in each helmet line (specifying a shell length setting, a shell width setting and a size class), together with a score.

It is recalled that, in a non-limiting example embodiment, each suggested variant may be associated with two possible cavity lengths and two possible cavity widths based on the fact that there are two available comfort padding thicknesses. As such, step 930 also includes selecting the thickness of the frontal/occipital comfort pads 64F/64B and thickness of the lateral comfort pads 64R/64L.

As discussed earlier, there may be some overlap between the range of cavity lengths achievable via different available shell length settings of different size classes, and between the range of cavity widths achievable via different available shell width settings of different size classes. This may result in there being two or more suggested variants in different size classes, but in the same helmet line. If there is a requirement to select a single suggested variant in the given helmet line, it may be preferable to choose the suggested variant in the smaller size class, as this would give an overall appearance that is sleeker.

Step 940:

The suggested variants of the adjustable retail helmet (in one or more helmet lines) identified at step 930 are output to the user via the user interface 860, which may include a display. This is shown by way of non-limiting example in FIG. 10D, where a window 1050 provides a score in association with each of three helmet lines of an adjustable retail helmet. The score associated with a particular helmet line is the score of the highest-scoring suggested variant in the particular helmet line. As such, in this example, there is one suggested variant in each of three helmet lines.

The user 8 may make a selection of a suggested variant in a particular helmet line by selecting (e.g., clicking) a sub-portion of the window 1050 (in this case, the leftmost of three suggested variants), which then causes the parameters of the selected suggested variant to appear in a sub-window 1090. Each suggested variant is associated with a size class, a shell length setting and a shell width setting. In this particular non-limiting example, the selected suggested variant is associated with a size class M, a shell length setting of 1.0 (e.g., this could be the $2^{nd}$ of N=5 shell length settings) and a shell width setting of 1.5 (e.g., this could be the $3^{rd}$ of M=5 shell width settings).

The user interface 860 also displays a rendered helmet, which is a rendering of the 3D model that represents the selected suggested variant of the adjustable retail helmet in the particular helmet line, in combination with the user's headform. The rendered helmet may be centered relative to the user's headform, using the markers 1030A-1030E previously discussed. The rendered helmet has the size class, shell length setting and shell width setting associated with the suggested variant of the adjustable retail helmet in the particular helmet line.

Figure 10B:
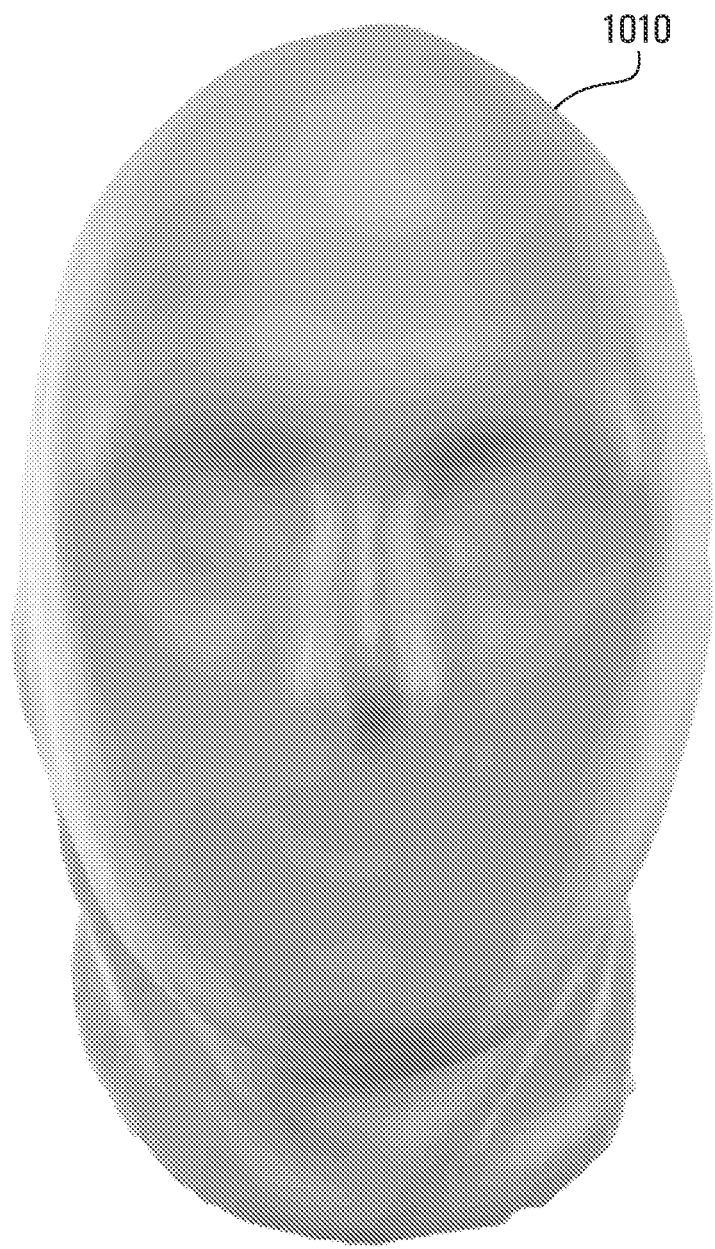
FIG. 10B illustrates a 3D model of a user's head.
Figure 10C:
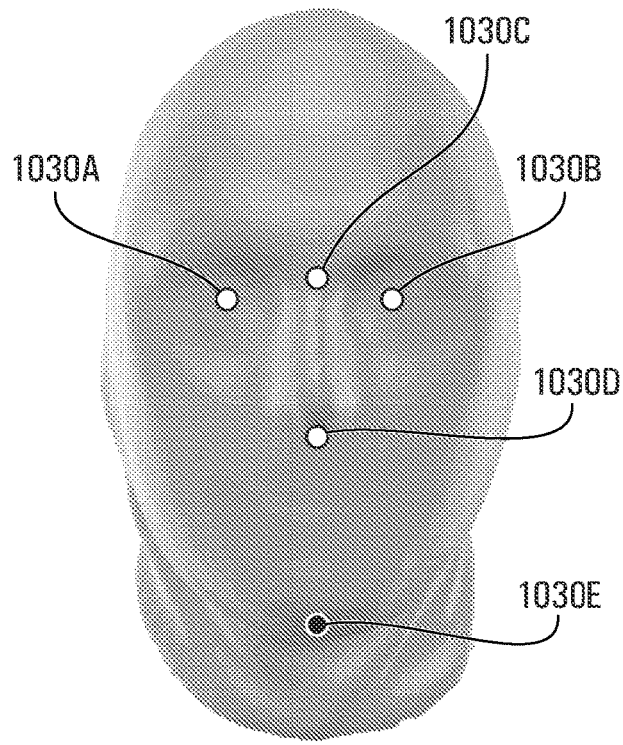
FIG. 10C illustrates the 3D model of FIG. 10B, in which markers are placed for purposes of registration.
Figure 10C:
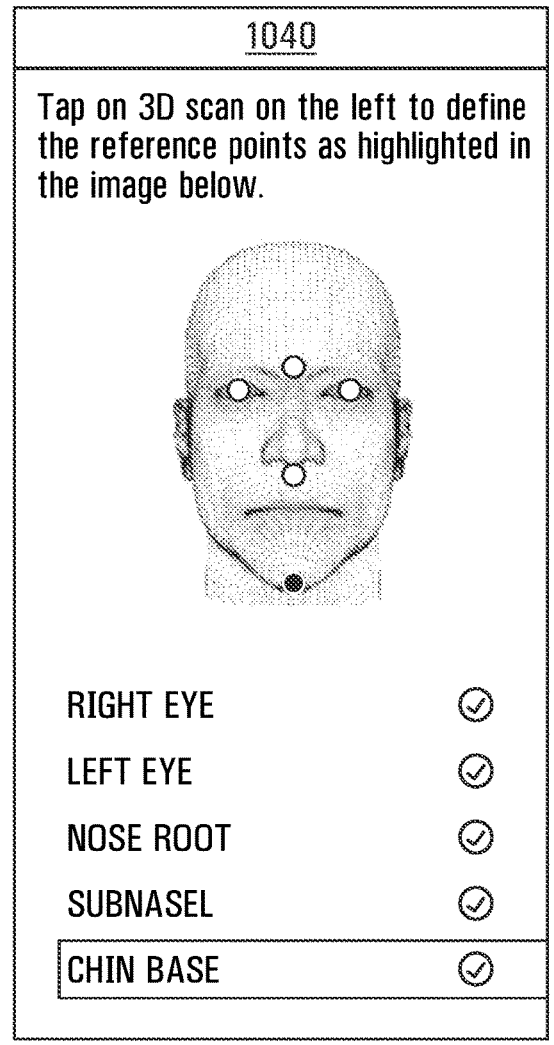
Figure 10D:
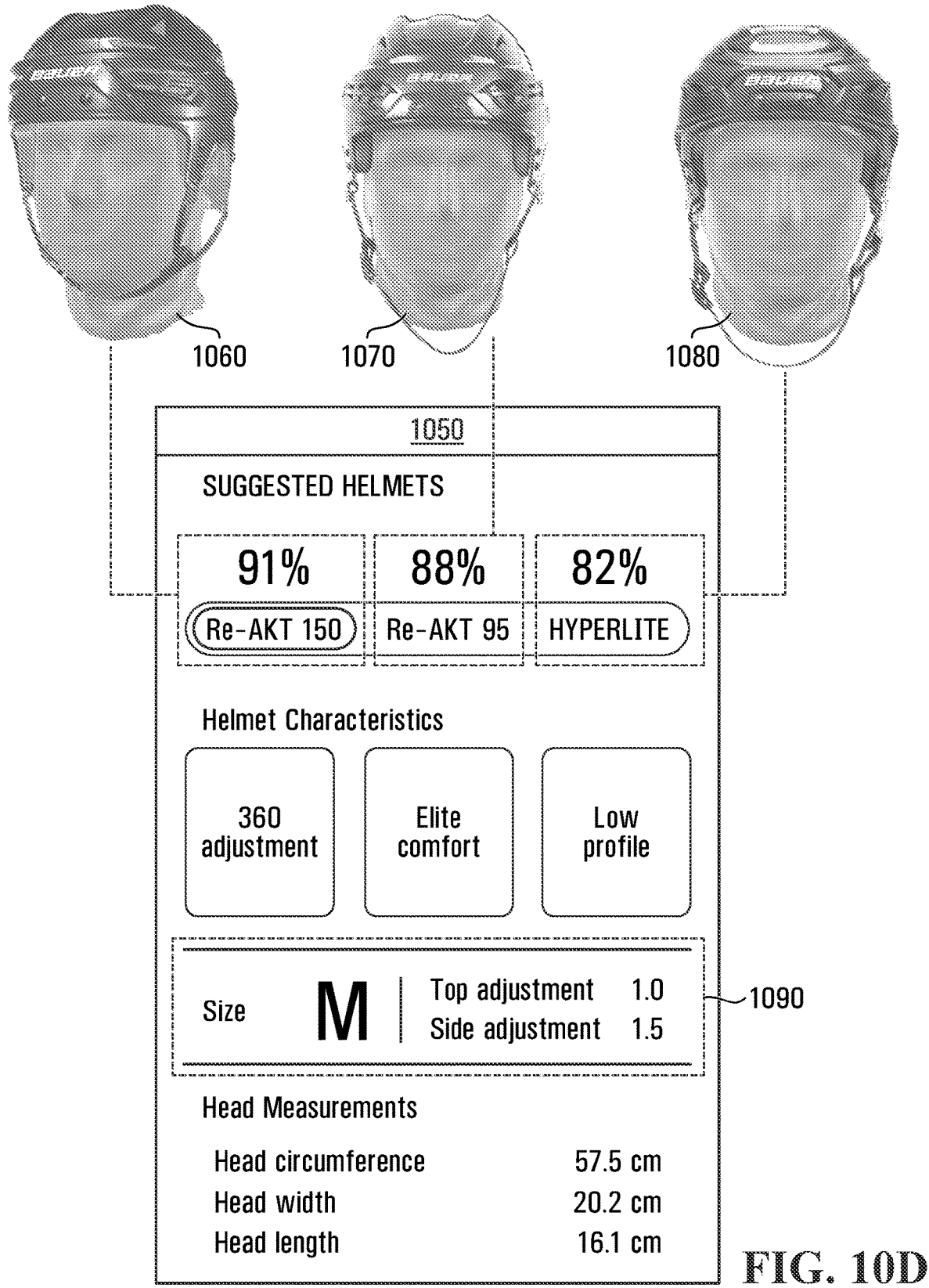
FIG. 10D is a screenshot of a screen that provides the user with information to assist in the selection of an adjustable retail helmet.

For example, FIG. 10D shows rendered helmets 1060, 1070, 1080, one for each of three helmet lines. It is envisaged that each rendered helmet may also account for placement of the frontal/occipital comfort pads 64F/64B and the lateral pads 64R/64L in the appropriate comfort padding thickness (e.g., the first comfort padding thickness or the second comfort padding thickness, when two comfort padding thicknesses are available) that results in the best fit, as determined in the manner described elsewhere in this document. However, the comfort pads may not be seen in the rendered helmets 1060, 1070, 1080 because they are obfuscated by the helmet shell.

With the information presented in the window 1050 and elsewhere on the display screen, the user 8 can make a judicious purchase of an adjustable retail helmet. The user 8 may thus be asked to confirm selection of one of the suggested variants, which specifies an adjustable retail helmet in a particular helmet line, in a particular size, with a particular shell length setting and a particular shell width setting, a particular thickness of the front/occipital and lateral comfort pads (if any are used). The specified adjustable retail helmet can be retrieved from inventory or shipped from a remote location to the user's address.

Helmet Customization

Figure 11:
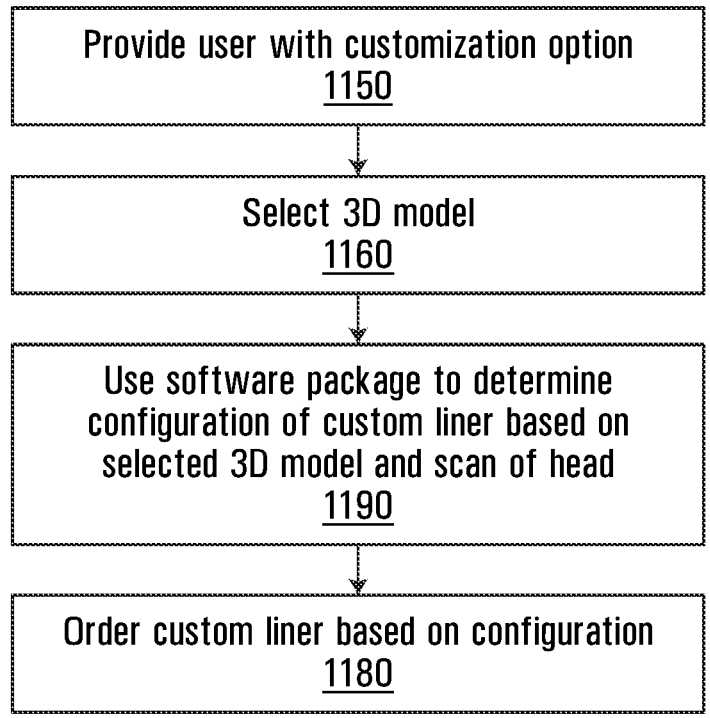
FIG. 11 is a flowchart showing a continuation of the helmet selection/customization process, in which the user has selected the customization option, in accordance with a non-limiting embodiment.

Reference is now made to the flowchart in FIG. 11, which adds further steps to the helmet selection process that transform it into a helmet selection and/or customization process.

Figure 12A:
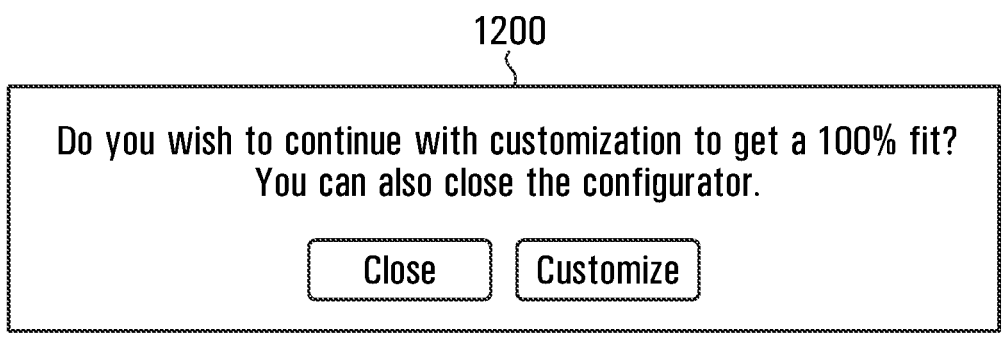
FIG. 12A is a screenshot of a screen in which the customization option is presented to the user.

Step 1150:

The user 8 is provided with the option of requesting customization, which can be done via the user interface 860. The user 8 may wish to proceed with customization if he or she is not satisfied with the suggested variants presented at step 940, or for a variety of other reasons. Specifically, as shown in FIG. 12A, a window 1200 is provided, inviting the user 8 to proceed with customization by clicking on a particular area of the screen marked "CUSTOMIZE". It is assumed that the user 8 has requested customization, in which case the next step is step 1160.

Step 1160:

A 3D model is selected. As was already mentioned, the data 840 in the memory 820 can include a plurality of 3D models. Each such 3D model represents a variant (of the adjustable retail helmet in a particular helmet line) that can be considered as a "starting point" (or "base helmets") for design of a custom comfort liner. If there are N×M variants of the adjustable retail helmet 200 and L size classes (in the particular helmet line), there can be N×M×L potential starting points for design of the custom comfort liner, each represented as its own 3D model.

In this case, there is a single selected suggested variant, in a particular helmet model, corresponding to a particular size class, a particular shell length adjustment and a particular shell width adjustment. The shell length adjustment corresponds to a particular cavity length and the particular shell width adjustment corresponds to a particular cavity width. The 3D model associated with the selected suggested variant (the "selected 3D helmet model") incorporates these aspects. In addition, the selected 3D model takes into account other design features that are characteristic of the particular helmet model.

Step 1170:

The file that represents the selected 3D helmet model and the file that represents the user's headform are processed by a software application so as to produce a file that represents a 3D model of a custom comfort liner. A non-limiting example of a suitable software application is nTopology, commercialized by nTopology, Inc., of New York, New York, United States.

Step 1180:

The file that represents a 3D model of a custom comfort liner is then sent to a production facility or sent to the user 8 to be forwarded to a production facility. The production facility could use a variety of techniques, including additive manufacturing techniques, to produce a custom comfort liner in accordance with the file that represents a 3D model of a custom comfort liner.

Once the custom comfort liner 420 has been produced and delivered to the user 8 (or to a retailer being visited by the user 8), it can be attached to the interior of the shell 405 in any suitable way. This could include through the use of hook-and-loop fasteners, clips, buttons, an adhesive, etc. This step could also be carried out by the manufacturer.

Those skilled in the art should appreciate that additional customization options may be provided to the user 8 via the user interface 860 as part of the helmet selection and/or customization process. In particular, and with reference to FIG. 4C, it is recognized that the custom comfort liner 420 may be constructed using a variety of lattice structures, including those using Kelvin cells and those using Gyroid cells, to use two non-limiting examples. As such, in response to being provided with a customization option at step 1150, the helmet selection and/or customization process can provide the user 8 with the opportunity to enter certain additional parameters related to construction of the custom comfort liner 420.

Figure 12B:
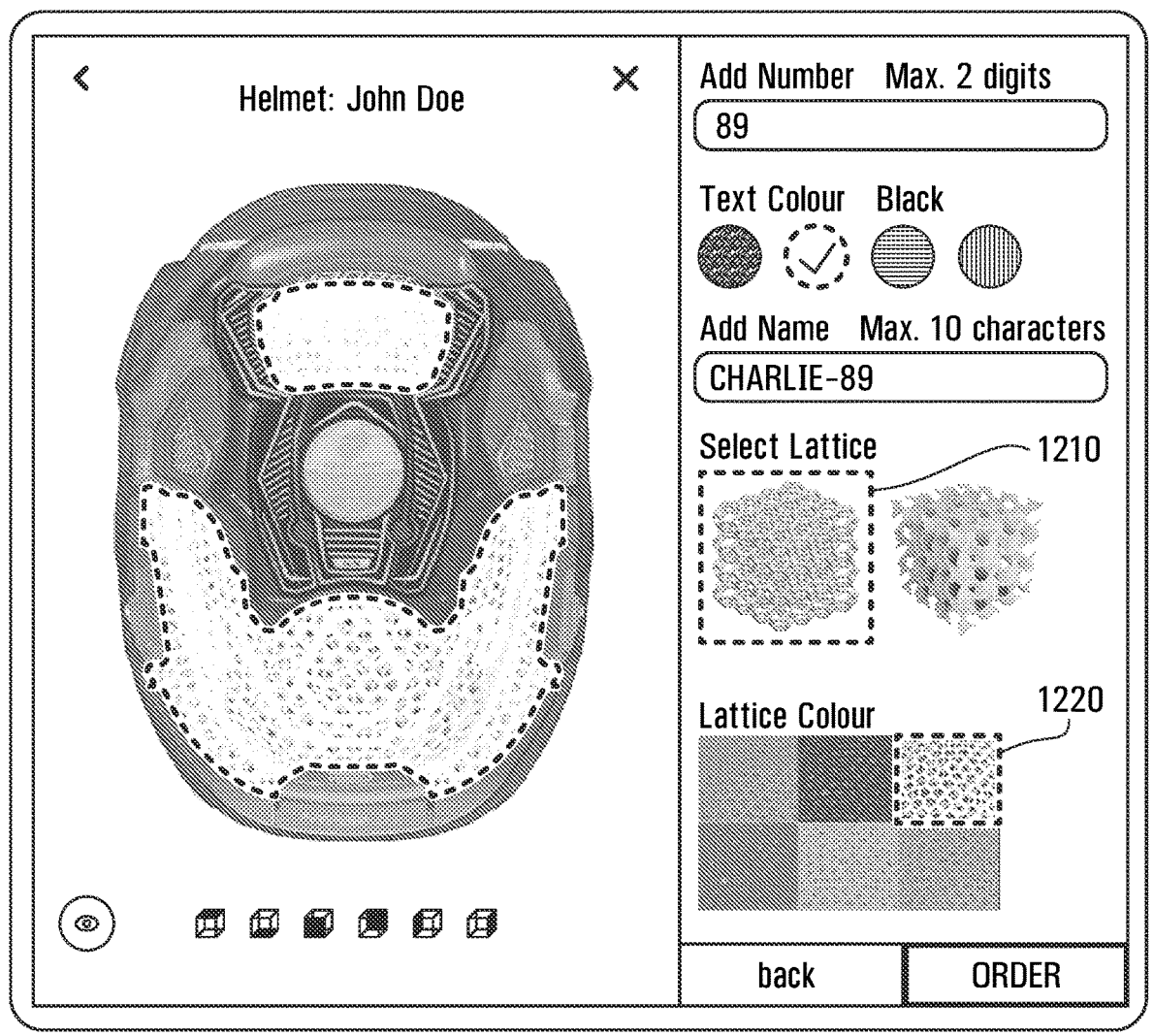
FIG. 12B is a screenshot of a screen through which the user is provided an opportunity to enter customization details regarding the design of a custom liner for the helmet.

For example, with reference to FIG. 12B, there is shown a screenshot that could be presented to the user 8, in which the user 9 is able to select the cell type 1210 for the lattice, as well as the lattice color 1220, via the user interface 860. This information is also transferred to the production facility or is embedded in the message transmitted to the user containing the file from which the custom liner 420 can be printed by an additive manufacturing apparatus.

Hair Factor

In some cases, the perceived fit of a helmet may be improved by taking into consideration the amount of hair on the user's head.

Figure 13:
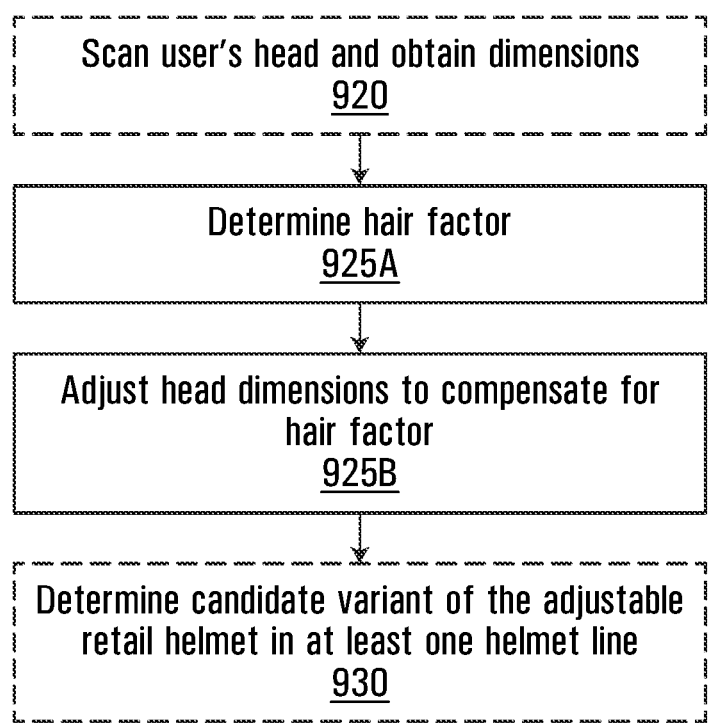
FIG. 13 is a flowchart showing additional steps in the helmet selection/customization process, which take into account the amount of hair on the user's head, in accordance with a non-limiting embodiment.

In particular, it is recalled that the scan performed at step 920 may be done while the user wears a cap or bonnet to keep the user's hair as close to the skull as possible. Nevertheless, both the cap and the user's hair (if any) occupy a volume and this can be compensated for before determining the suggested variant at step 930. To this end, and with reference to FIG. 13, two additional sub-steps 925A, 925B may be performed between steps 920 and 930 of FIG. 9.

Specifically, sub-step 925A includes determining a "hair factor" for the user 8. A hair factor can be a rating (e.g., from 0 to 9 or from 0 to 2) of the amount of hair. In one embodiment, the hair factor can be determined by user 8 and entered into the computing apparatus 800 via the user interface 860, as shown in FIG. 10A, where three choices of hair type are presented, namely "bald", "fine" and "thick" associated with hair factor 0, 1 and 2, respectively.

It is expected that the user 8 will find it easy to make the correct selection through auto-evaluation. In another embodiment, the hair factor can be determined automatically by the computing apparatus 800 through optical processing of images of the user's head, obtained from the 3D scanner 880 or a digital camera (such as on the user's own smartphone 890) or from a player database stored as part of the data 840 in the memory 820.

At sub-step 925B, the head dimensions obtained from the 3D scan are compensated for by the hair factor obtained at sub-step 925A. Specifically, the dimensions of the head can be reduced by a few mm compared to what was measured optically (via the 3D scanner 880 or the smartphone 890) with the user 8 donning a cap. The following table shows the applied reduction (expressed in millimeters) in head length, head width, head circumference and head height (e.g., measured from the level of the plane of elevation where the head length and head width are taken to the top of the head) as a function of the hair factor:

| HAIR TYPE | HAIR FACTOR | CIRC. | WIDTH | LENGTH | TOP |
|---|---|---|---|---|---|
| BALD | 0 | −2.5 | −3.0 | −0.5 | −0.0 |
| FINE | 1 | −2.50 | −4.5 | −2.50 | −2.0 |
| THICK | 2 | −9.0 | −6.3 | −4.5 | −3.0 |

The updated head dimensions are then used for selection of the suggested variant at step 930.

In addition, if the user 8 chooses the customization option at step 1150, the updated head dimensions are then used to obtain an updated 3D model of the user's head. Due to the smaller dimensions, the updated 3D model will be slightly compressed compared to the original 3D model of the user's head, and can thus be referred to as a "compressed user headform". The desired compression of the user's headform can be achieved digitally through the use of a software program that implements a compression and smoothing algorithm. The compressed user headform is then used as the headform at step 1170 when designing the custom comfort liner 420.

In the foregoing, the value of the head height was used in the compression of the user headform. However, it should be appreciated that head height can be an additional parameter used in the selection of a suggested variant at step 930 of the helmet selection process. That is to say, different size classes could be associated with different head heights. As such, in the event that there are two or more suggested variants in the same helmet line that have different shell length settings and shell width settings, but are in different helmet sizes, then it is envisaged that one of these variants will have a cavity height that is more suited to the user's head height than the other variant.

It is also envisaged to factor the head height into the score associated with a suggested variant. Specifically, in addition to being affected the relative (e.g., %) difference between the measured head length and the shell length resulting from the shell length setting associated with the suggested variant and the relative (e.g., %) difference between the measured head width and the shell width resulting from the shell width setting associated with the suggested variant, the score could be affected by the relative (e.g., %) difference between the measured head height and the cavity height associated with the size class to which the suggested variant belongs.

Similarly to the head height, the head volume can also be an additional parameter used in the selection of a suggested variant at step 930 and/or can be factored into the score associated with a suggested variant.

Figure 15:
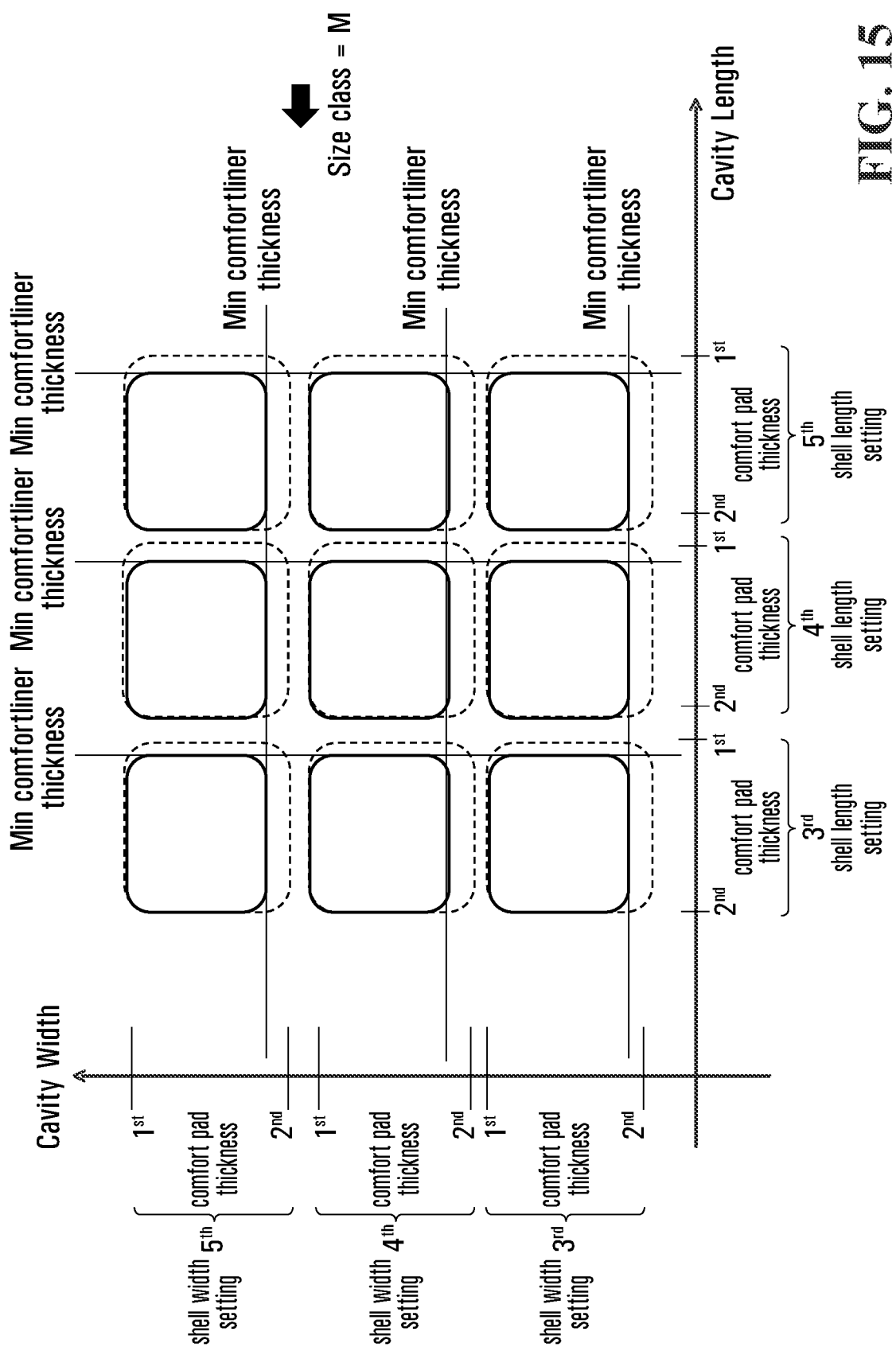
FIG. 15 is a graph similar to the graph of FIG. 6, except that the regions of perfect fit are curtailed to account differences between a minimum thickness of a custom liner and a minimum thickness of a comfort pad for a retail helmet.
Figure 16:
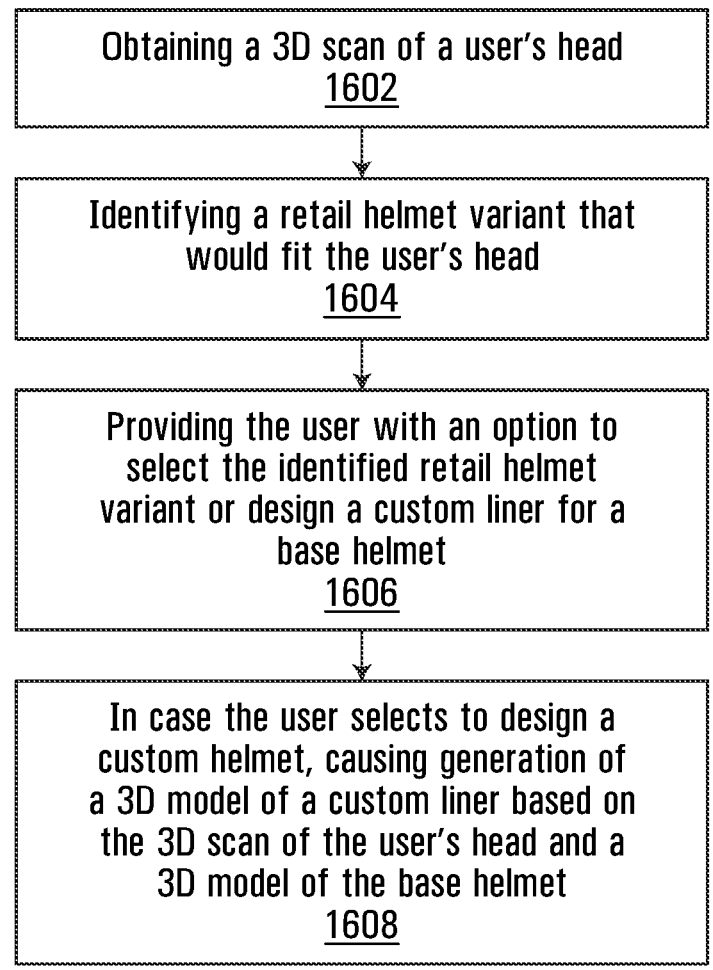
FIGS. 16 to 19 are flowchart showing steps in various processes that can be carried out by the system of FIG. 8, in accordance with non-limiting embodiments.

In some cases, and with reference to FIG. 15, the comfort liner 420 of the custom helmet 400 will have a minimum achievable liner thickness as a result of constraints of the manufacturing process, such as may be associated with additive manufacturing techniques. The minimum achievable liner thickness of the comfort liner 420 may turn out to be greater than the first comfort padding thickness, which was associated with the thinnest comfort pads that could be used in the adjustable retail helmet 200. It is recalled that the first comfort padding thickness may even be zero if no comfort padding is used in the adjustable retail helmet 200.

To illustrate this conceptually, reference is made to FIG. 5B, wherein:

A new rightmost boundary of the island 510 has been set, corresponding to the maximum cavity length that is achievable with the minimum comfort liner thickness.

A new uppermost boundary of the island 510 has been set, corresponding to the maximum cavity width that is achievable with the minimum comfort liner thickness.

For example, consider that the first comfort padding thickness is 2 mm and that the minimum liner thickness of the comfort liner 420 is 3 mm. If the measured head dimensions specify a user data point in the graph 500 that is on one of the islands corresponding to a given variant of the adjustable retail helmet 200, but happens to be less than 1 mm to the left of the rightmost boundary of that island, then it may not be possible to achieve a perfect fit for the custom helmet by using the given variant as a starting point (or "base helmet").

In this case, it may be beneficial to consider a second variant of the adjustable retail helmet 200, namely one associated with a length adjustment setting that provides a greater cavity length, but ensuring that the measured head dimensions specify a user data point in the graph 500 that is on the island corresponding to this second variant of the adjustable retail helmet 200. (This implies that there should be an overlap between the two islands.) Because of the added space margin provided by the greater cavity length, the resulting customized comfort liner will be thick enough to be greater than the minimum achievable liner thickness, thereby facilitating manufacture.

Based on the foregoing, it can be appreciated that the system of FIG. 8 carries out a variety of processes, which are now described with reference to the flowcharts in FIGS. 16-19. Specifically, with reference to FIG. 16, there is shown a first computer-implemented implemented helmet selection/customization process, which comprises: obtaining a 3D scan of a user's head (step 1602); identifying a retail helmet variant that would fit the user's head (step 1604); providing the user with an option to select the identified retail helmet variant or design a custom liner for a base helmet (step 1606); and in case the user selects to design a custom helmet, causing generation of a 3D model of a custom liner based on the 3D scan of the user's head and a 3D model of the base helmet (step 1608). The retail helmet variants can be representations of the same model of helmet but with different combinations of adjustment settings (for, e.g., the length and width). The 3D model of the base helmet is in the same helmet line as the adjustable retail helmet, and therefore shares some structural, design and performance characteristics with the adjustable retail helmet, including potentially shell material and shell profile. Selection of the identified retail helmet can be done based on closeness of fit, e.g., minimizing the difference between (i) a feasible setting of the adjustment mechanisms together plus available comfort padding thicknesses; and (ii) the dimensions of the user's head, with the added constraint that the user's head still fit into the resulting cavity.

Figure 17:
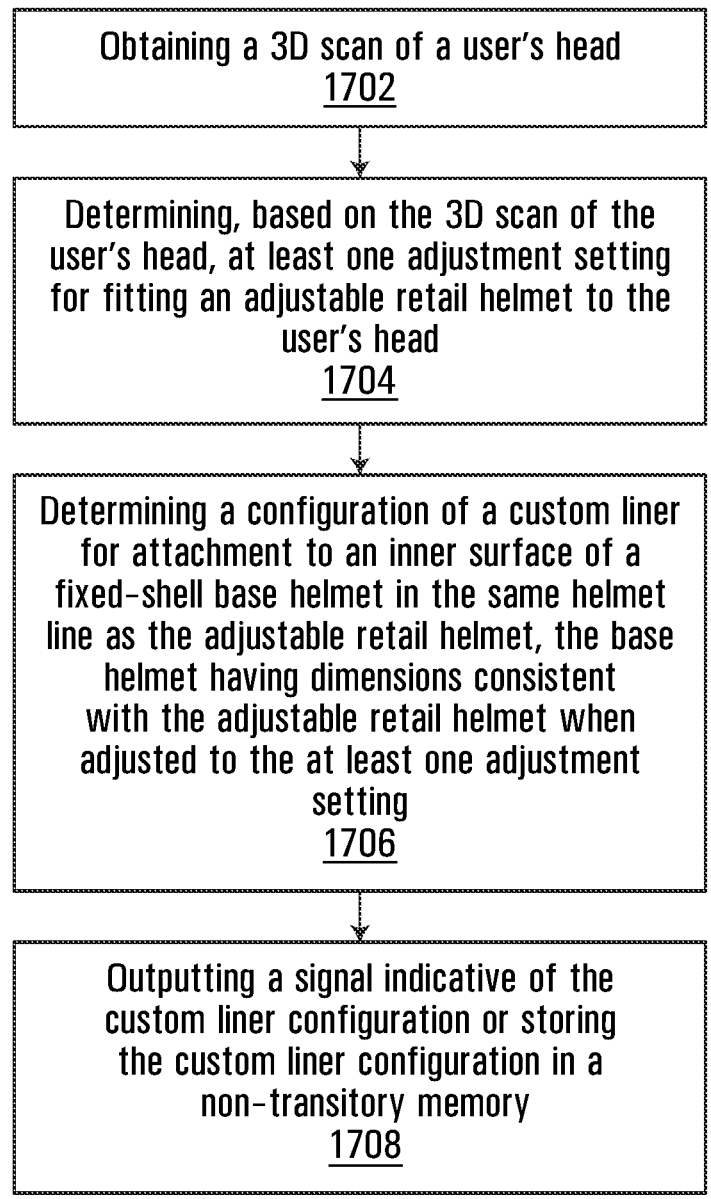

With reference to FIG. 17, there is shown a flowchart illustrating a method of operating a computing apparatus to design a custom helmet liner, comprising: obtaining a 3D scan of a user's head (step 1702); determining, based on the 3D scan of the user's head, at least one adjustment setting for fitting an adjustable retail helmet to the user's head (step 1704); determining a configuration of a custom liner for attachment to an inner surface of a fixed-shell base helmet in the same helmet line as the adjustable retail helmet (step 1706), the base helmet having dimensions consistent with the adjustable retail helmet when adjusted to the at least one adjustment setting; and outputting a signal indicative of the custom liner configuration or storing the custom liner configuration in a non-transitory memory (step 1708). The base helmet is in the same helmet line as the adjustable retail helmet, and therefore shares some structural, design and performance characteristics with the adjustable retail helmet, including potentially shell material and shell profile. The custom liner configuration attaches to the base helmet and is custom made to fit the shape of the user's head. It may be 3D printed and may have a lattice structure.

Figure 18:
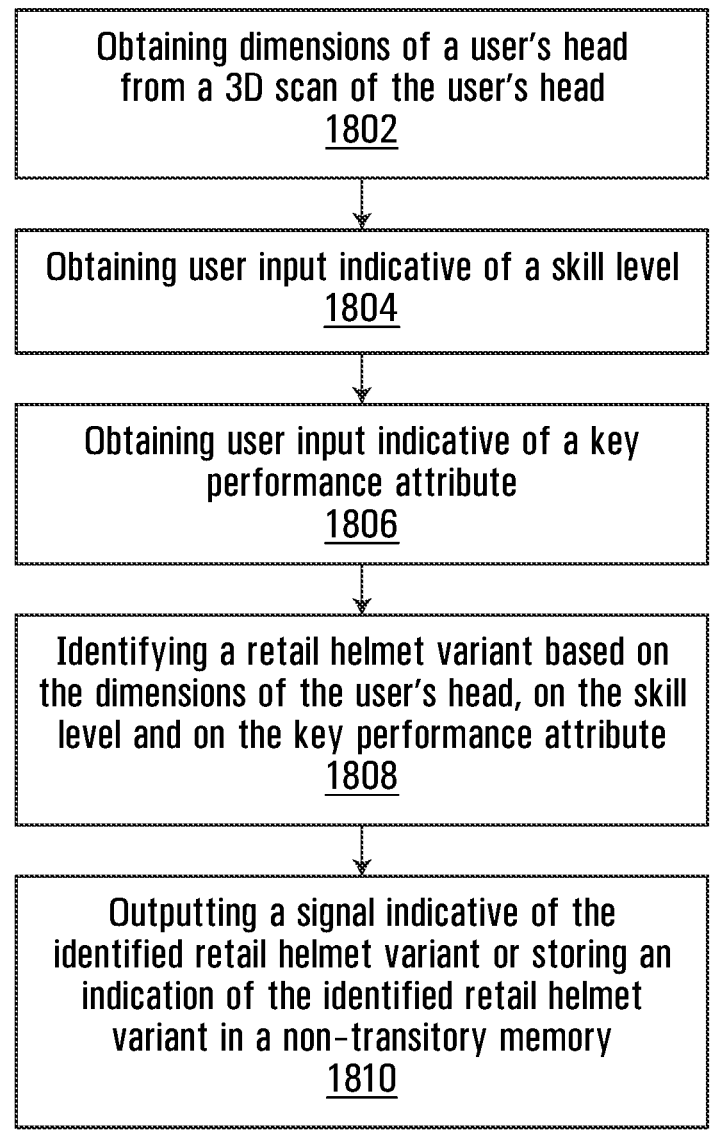

Turning now to FIG. 18, there is shown a flowchart for a computer-implemented helmet selection and/or customization process, comprising: obtaining dimensions of a user's head from a 3D scan of the user's head (step 1802); obtaining user input indicative of a skill level (step 1804); obtaining user input indicative of a key performance attribute (step 1806); identifying a retail helmet variant based on the dimensions of the user's head, on the skill level and on the key performance attribute (step 1808); and outputting a signal indicative of the identified retail helmet variant or storing an indication of the identified retail helmet variant in a non-transitory memory (step 1810). There identified retail helmet, i.e., the one that best fits the user's head, could be selected based on a score that is generated partly based on physical fit (e.g., minimizing the gap between the head and the adjustable retail helmet variant) and also partly based on the user input (skill level and key performance attribute). In some embodiments, only one of these two characteristics (either skill level or key performance attribute) can be part of the score.

Figure 19:
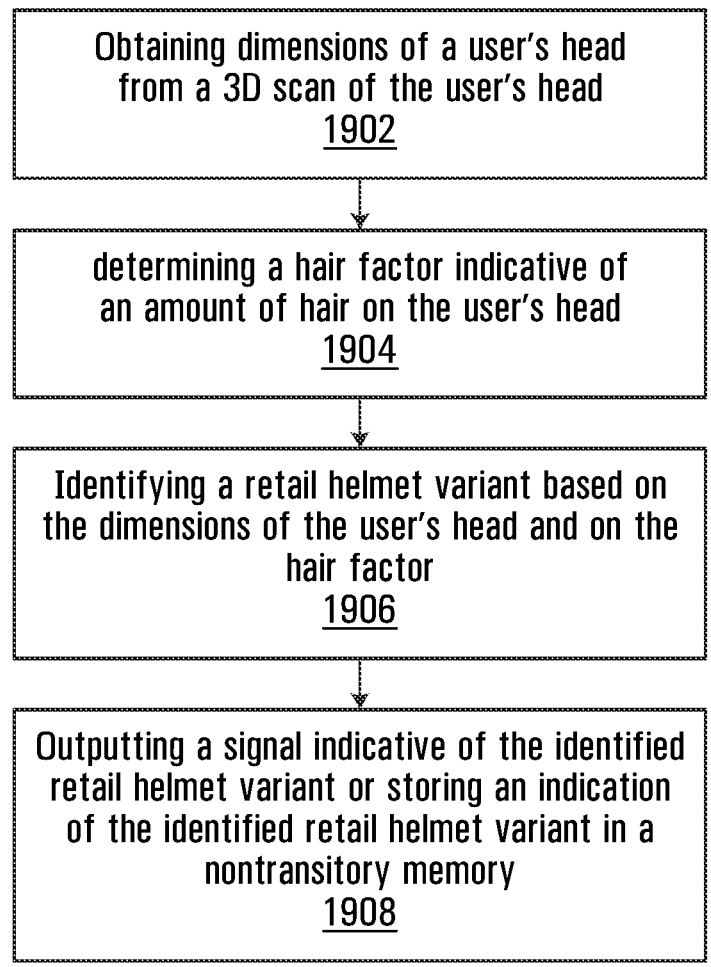

Referring finally to FIG. 19, there is shown a flowchart illustrating the steps in a computer-implemented helmet selection and/or customization process, comprising: obtaining dimensions of a user's head from a 3D scan of the user's head (step 1902); determining a hair factor indicative of an amount of hair on the user's head (step 1904); identifying a retail helmet variant based on the dimensions of the user's head and on the hair factor (step 1906); and outputting a signal indicative of the identified retail helmet variant or storing an indication of the identified retail helmet variant in a non-transitory memory (step 1908). The hair factor can be determined based on user input (self-assessment) or by machine processing of images of the user's head without a cap. Such images could also be obtained from online sources if not supplied by the user. The hair factor can have as many or as few levels as desired, such as 2 levels, 3 levels (illustrated herein), 4 levels, 5 levels, 10 levels, etc. Taking into account the hair factor means shrinking the headform by an amount that depends on the hair factor. In some embodiments, the headform is shrunk even if the user has no hair on their head, which could be to account for the thickness of the cap and/or to allow a fit that is more snug.

In some embodiments, the helmet is a hockey helmet but in other embodiments, the helmet can be a football helmet, a motorcycle helmet, a construction helmet, etc.

Aspects of the present disclosure are described herein with reference to flowcharts and block diagrams of methods and apparatus (systems), according to various embodiments. It will be understood that each block of the flowcharts and block diagrams, and combinations of such blocks, can be implemented by execution of the program instructions. Namely, the program instructions, which are read and processed by the processor of the aforementioned computing apparatus, direct the processor to implement the functions/acts specified in the flowchart and/or block diagram block or blocks. It will also be noted that each block of the flowcharts and/or block diagrams, and combinations of such blocks, can also be implemented by special purpose hardware-based systems that perform the specified functions or acts or carry out combinations of special purpose hardware and computer instructions.

The flowcharts and block diagrams illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It should be appreciated that throughout the specification, discussions utilizing terms such as "processing", "computing", "calculating", "determining", "analyzing" or the like, can refer to the action and/or processes of a computer or computing system, or similar electronic computing device, that manipulate and/or transform data represented as physical, such as electronic, quantities into other data similarly represented as physical quantities.

As used herein, unless otherwise specified, the use of the ordinal adjectives "first", "second", "third", etc., to describe a common object or step, merely indicate that different instances of like objects or steps are being referred to, and are not intended to imply that the objects or steps so described must be in a given sequence, either temporally, spatially, in ranking, or in any other manner.

It is noted that various individual features may be described only in the context of one embodiment. The particular choice for description herein with regard to a single embodiment is not to be taken as a limitation that the particular feature is only applicable to the embodiment in which it is described. Various features described in the context of one embodiment described herein may be equally applicable to, additive, or interchangeable with other embodiments described herein, and in various combinations, groupings or arrangements. In particular, use of a single reference numeral herein to illustrate, define, or describe a particular feature does not mean that the feature cannot be associated or equated to another feature in another drawing figure or description.

Also, when the phrase "at least one of A and B" is used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles and modes of operation of certain embodiments. However, these embodiments should not be considered limiting. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

What is claimed is:

1. A method of operating a computing apparatus to design a custom helmet liner, comprising:
obtaining a 3D scan of a user's head;
determining, based on the 3D scan of the user's head, at least one adjustment setting for fitting an adjustable retail helmet to the user's head;
determining a configuration of a custom liner for attachment to an inner surface of a fixed-shell base helmet in the same helmet line as the adjustable retail helmet, the base helmet having dimensions consistent with the adjustable retail helmet when adjusted to the at least one adjustment setting; and
outputting a signal indicative of the custom liner configuration or storing the custom liner configuration in a non-transitory memory.

2. The method defined in claim 1, wherein the at least one adjustment setting comprises a shell length adjustment.

3. The method defined in claim 1, wherein the at least one adjustment setting comprises a shell width adjustment.

4. The method defined in claim 1, further comprising selecting the fixed-shell base helmet from a database of fixed-shell base helmets in the same helmet line as the adjustable retail helmet.

5. The method defined in claim 4, wherein the fixed-shell base helmets and the adjustable retail helmet share common features characteristic of the helmet line.

6. The method defined in claim 5, wherein the common features characteristic of the helmet line include a shell profile and a shell material.

7. The method defined in claim 4, wherein each of the base helmets is associated with cavity parameters characterizing a cavity defined by the base helmet.

8. The method defined in claim 7, wherein the at least one adjustment setting is associated with cavity parameters characterizing the adjustable retail helmet when adjusted to the at least one adjustment parameter.

9. The method defined in claim 8, wherein the selecting is carried out such that the cavity parameters of the selected base helmet match the cavity parameters associated with the at least one adjustment setting.

10. The method defined in claim 4, further comprising determining, based on the 3D scan of the user's head, a size class of the adjustable retail helmet, the size class being one of a plurality of size classes.

11. The method defined in claim 10, wherein the selecting is carried out such that the selected base helmet matches the size class of the adjustable retail helmet.

12. The method defined in claim 10, wherein the plurality of size classes includes at least a small size class, a medium size class and a large size class.

13. The method defined in claim 1, wherein determining, based on the 3D scan of the user's head, the at least one adjustment setting for the adjustable retail helmet comprises:
determining, based on the 3D scan of the user's head, parameters associated with the user's head; and
accessing a database storing parameters associated with each of a plurality of retail helmet variants, each retail helmet variant representing a different combination of helmet adjustment settings;
processing the parameters associated with the user's head and the parameters stored in the database, so as to determine the at least one adjustment setting for fitting the adjustable retail helmet to the user's head.

14. The method defined in claim 13, wherein the parameters associated with the user's head comprise at least a head length and a head width.

15. The method defined in claim 1, wherein determining the configuration of the custom liner comprises causing generation of a 3D model of the custom liner based on the 3D scan of the user's head and a 3D model of the base helmet.

16. The method defined in claim 15, wherein causing generation of a 3D model of the custom liner based on the 3D scan of the user's head and a 3D model of the base helmet comprises adjusting the 3D scan of the user's head to account for an amount of hair of the user's head.

17. The method defined in claim 15, wherein causing generation of a 3D model of the custom liner based on the 3D scan of the user's head and a 3D model of the base helmet comprises adjusting the 3D scan of the user's head based on a hair factor indicative of an amount of hair of the user's head.

18. The method defined in claim 17, further comprising providing an opportunity for the user to make a hair factor selection via a graphical user interface, the hair factor being determined based on the hair factor selection.

19. The method defined in claim 1, further comprising implementing an additive manufacturing process to create a liner based on the custom liner configuration.

20. The method defined in claim 1, wherein the configuration of the custom liner comprises a 3D model.

21. The method defined in claim 1, wherein a custom helmet made from the base helmet and a custom liner made in accordance with the custom liner configuration is deemed certified by virtue of the adjustable retail helmet variant being certified.

22. The method defined in claim 1, wherein obtaining the 3D scan of the user's head comprises scanning the user's head with a contactless scanner.

23. The method defined in claim 1, wherein the 3D model of the base helmet comprises a 3D model of a shell and a 3D model of protective padding distributed throughout the shell.

24. A non-transitory computer-readable storage medium storing computer-readable instructions which, when executed by a processor of a computing apparatus, cause the computing apparatus to carry out a method that comprises:
determining, based on the 3D scan of the user's head, at least one adjustment setting for fitting an adjustable retail helmet to the user's head;
determining a configuration of a custom liner for attachment to an inner surface of a fixed-shell base helmet in the same helmet line as the adjustable retail helmet, the base helmet having dimensions consistent with the adjustable retail helmet when adjusted to the at least one adjustment setting; and
outputting a signal indicative of the custom liner configuration or storing the custom liner configuration in a non-transitory memory.

25. A system, comprising:
a 3D scanning apparatus; and
a computing apparatus, comprising:
a processor;
an interface operatively coupled to the 3D scanning apparatus; and
a non-transitory computer-readable storage medium storing computer-readable instructions which, when executed by the processor, cause the computing apparatus to carry out a method that comprises:
determining, based on the 3D scan of the user's head, at least one adjustment setting for fitting an adjustable retail helmet to the user's head;
determining a configuration of a custom liner for attachment to an inner surface of a fixed-shell base helmet in the same helmet line as the adjustable retail helmet, the base helmet having dimensions consistent with the adjustable retail helmet when adjusted to the at least one adjustment setting; and
outputting a signal indicative of the custom liner configuration or storing the custom liner configuration in a non-transitory memory.

26. The system defined in claim 25, implemented as a retail kiosk.

27. A helmet, comprising:
a shell;
protective padding affixed to or integrated with the shell; and
a custom liner attached to the protective padding and/or the shell, the custom liner made by a process that comprises:
obtaining a 3D scan of a user's head;
determining, based on the 3D scan of the user's head, at least one adjustment setting for fitting an adjustable retail helmet to the user's head;
determining a configuration of a custom liner for attachment to an inner surface of a fixed-shell base helmet in the same helmet line as the adjustable retail helmet, the base helmet having dimensions consistent with the adjustable retail helmet when adjusted to the at least one adjustment setting; and
creating the custom liner based on the custom liner configuration.

* * * * *